(12) United States Patent
Pacini et al.

(10) Patent No.: US 12,549,089 B2
(45) Date of Patent: Feb. 10, 2026

(54) METHOD AND CONTROL CIRCUIT FOR OPERATING A POWER CONVERTER

(71) Applicant: Infineon Technologies Austria AG, Villach (AT)

(72) Inventors: Alex Pacini, Villach (AT); Gerald J. Deboy, Klagenfurt (AT); Matthias J. Kasper, Villach (AT); Kenneth K Leong, Villach (AT)

(73) Assignee: Infineon Technologies Austria AG, Villach (AT)

( * ) Notice: Subject to any disclaimer, the term of this patent is extended or adjusted under 35 U.S.C. 154(b) by 187 days.

(21) Appl. No.: 18/434,042

(22) Filed: Feb. 6, 2024

(65) Prior Publication Data

US 2024/0291377 A1    Aug. 29, 2024

(30) Foreign Application Priority Data

Feb. 23, 2023   (EP) .................................. 23158133

(51) Int. Cl.
*H02M 1/084*   (2006.01)
*H02M 1/00*    (2006.01)
*H02M 1/08*    (2006.01)
*H02M 1/42*    (2007.01)

(52) U.S. Cl.
CPC ......... *H02M 1/084* (2013.01); *H02M 1/0009* (2021.05); *H02M 1/081* (2013.01); *H02M 1/4216* (2013.01); *H02M 1/4233* (2013.01)

(58) Field of Classification Search
CPC ............................ H02M 1/084; H02M 1/4233
See application file for complete search history.

(56) References Cited

U.S. PATENT DOCUMENTS

| | | | | |
|---|---|---|---|---|
| 2013/0051096 | A1* | 2/2013 | Carletti | H02M 1/4225 363/84 |
| 2018/0076705 | A1  | 3/2018 | Zhao et al. | |
| 2020/0295668 | A1* | 9/2020 | Bortis | H02M 1/12 |
| 2021/0359595 | A1* | 11/2021| Everts | H02M 7/219 |

OTHER PUBLICATIONS

Schrittwieser Lukas et al: "99% Efficient Isolated Thre •• Phase Matrix-Type DAB Buck-Boost PFC Rectifier", IEEE Transactions on Power Electronics, Institute of Electrical and Electronics Engineers, USA, vol. 35, No. 1, Jan. 1, 2020 (Jan. 1, 2020), pp. 138-157, XP011751958.
Singh Amit Ket al: "A Single-Stage Isolated Bidirectional Matrix Based AC-DC Converter for Energy Storage", IECON 2017—43rd Annual Conference of the IEEE Industrial Electronics Society, IEEE, Oct. 29, 2017 (Oct. 29, 2017), pp. 2744-2749, XP033279917.
Extended EP Search Report, EP 23 15 8133, Jul. 18, 2023, pp. 1-8.

* cited by examiner

*Primary Examiner* — Gary A Nash
(74) *Attorney, Agent, or Firm* — Armis IP Law, LLC

(57) ABSTRACT

Disclosed is a method and apparatus. The method comprises generating an alternating voltage (Vmn) based on three alternating input voltages (Va, Vb, Vc) received at an input (a, b, c) of a power converter, wherein generating the alternating intermediate voltage (Vmn) comprises controlling waveforms of three input currents (Ia, Ib, Ic) received at the input (a, b, c) dependent on waveforms of the three alternating input voltages (Va, Vb, Vc).

14 Claims, 20 Drawing Sheets

STATE: ST1 (|V12|=Vab, |V13|= - Vca)
TIME PERIOD: 201 (Vmn=Vab)

STATE: ST1 (|V12|=Vab, |V13|= - Vca)
TIME PERIOD: 202 (Vmn= -Vca)

STATE: ST1 (|V12|=Vab, |V13|= - Vca)
TIME PERIOD: 203 (Vmn= -Vab)

STATE: ST1 (|V12|=Vab, |V13|= - Vca)
TIME PERIOD: 204 (Vmn= Vca)

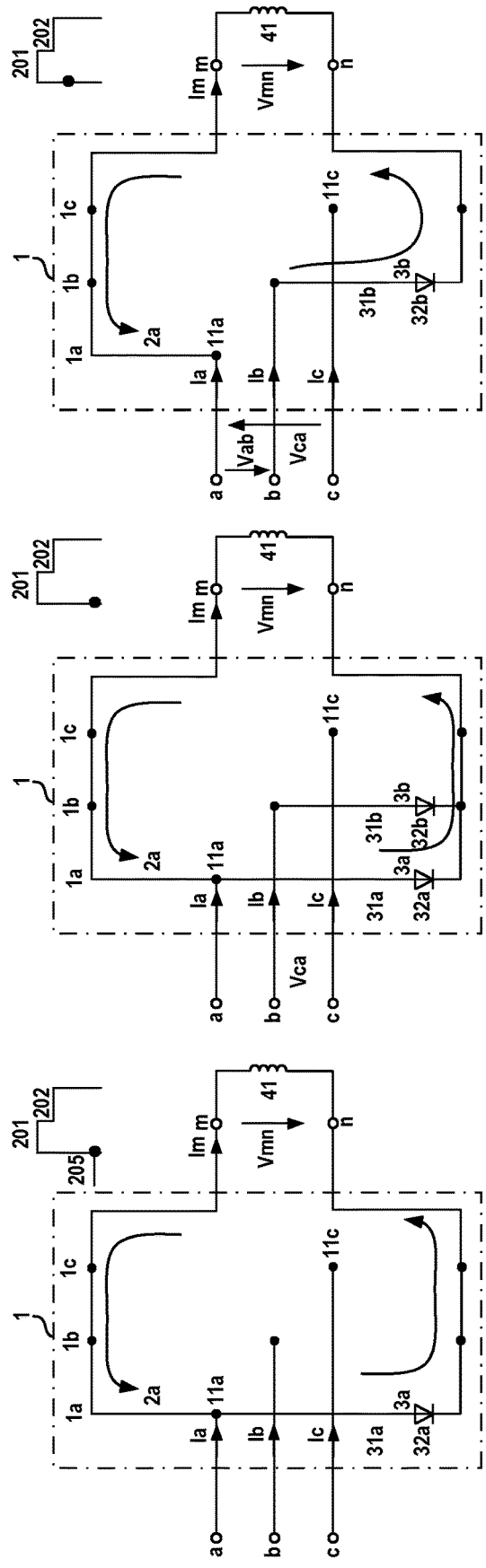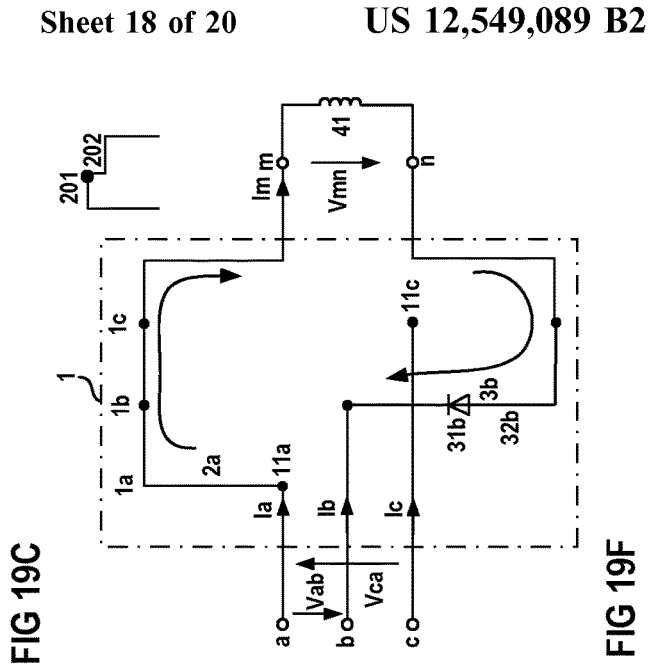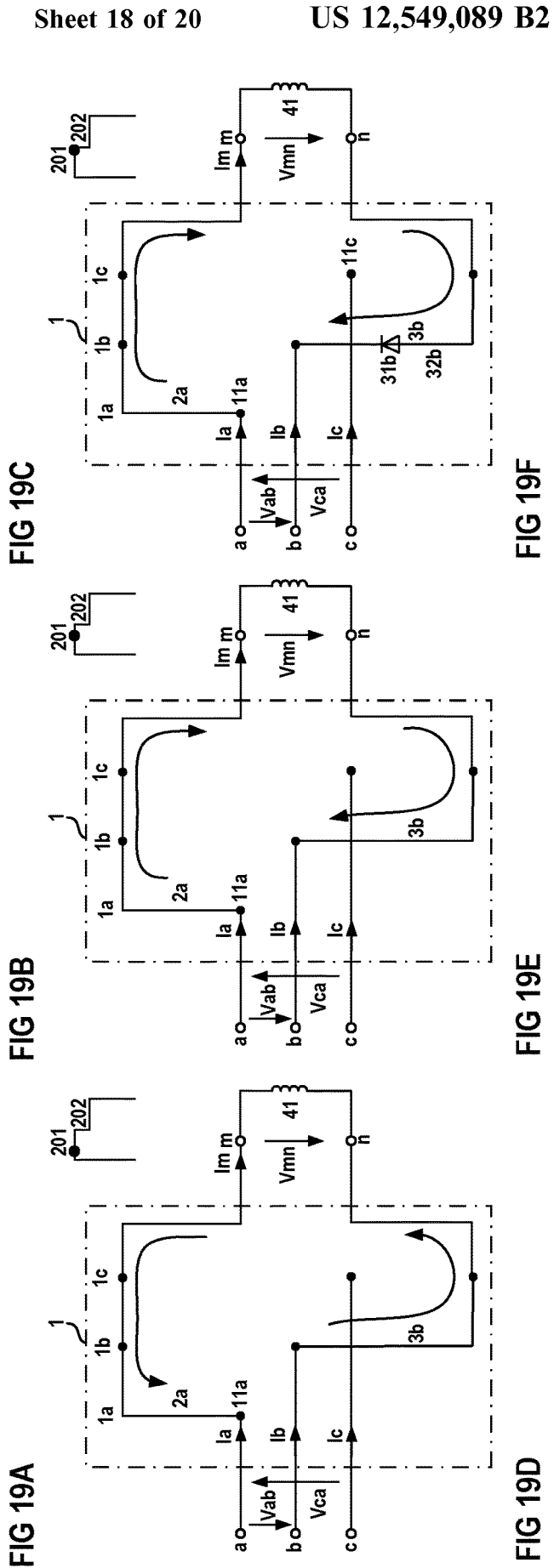

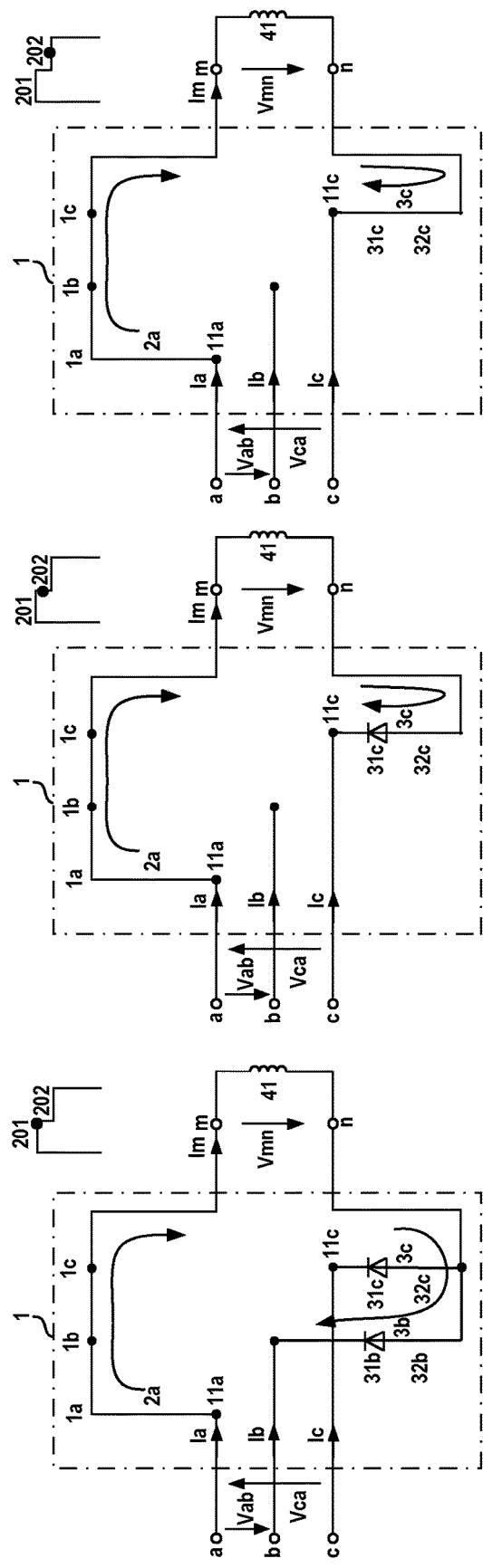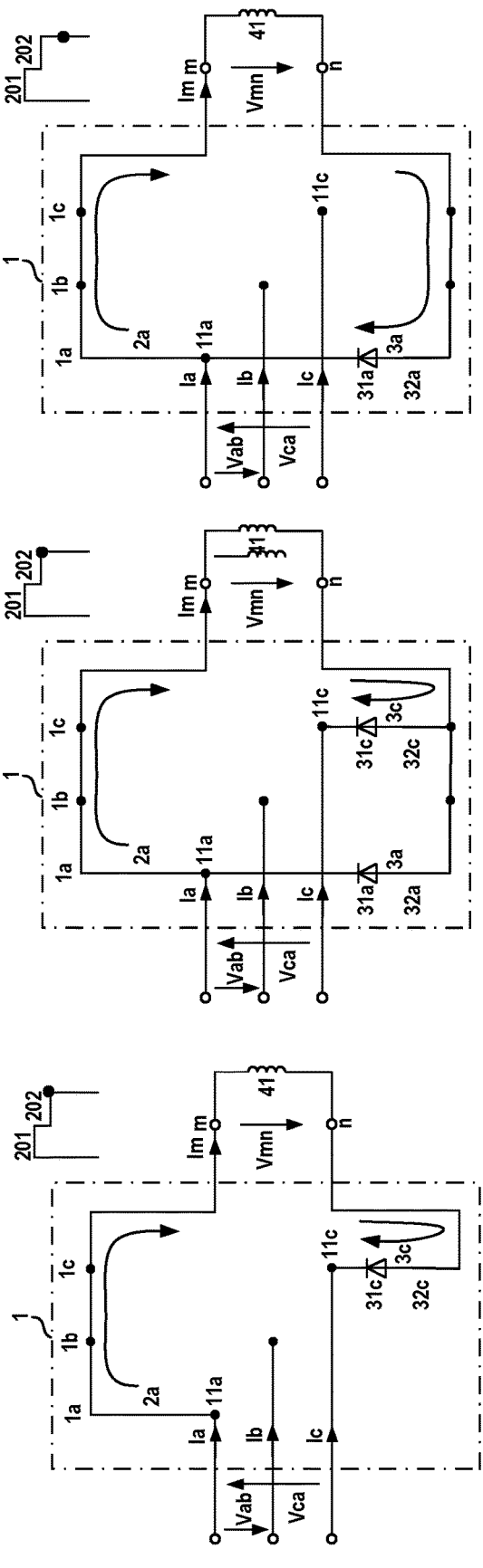
FIG 19G
FIG 19H
FIG 19I
FIG 19J
FIG 19K
FIG 19L

METHOD AND CONTROL CIRCUIT FOR OPERATING A POWER CONVERTER

RELATED APPLICATION

This application claims priority to earlier filed European Patent Application Serial Number EP23158133 entitled "METHOD AND CONTROL CIRCUIT FOR OPERATING A POWER CONVERTER," filed on Feb. 23, 2023, the entire teachings of which are incorporated herein by this reference.

BRIEF DESCRIPTION OF INVENTION

This disclosure relates in general to a method and a control circuit for operating a power converter, in particular a three-phase PFC (Power Factor Correction) power converter.

Three-phase PFC power converters, which may also be referred to as PFC power rectifiers, are widely used in various kinds of power conversion applications. Examples of such applications include on-board chargers (OBC) that are configured to charge a battery of a vehicle, or power supplies for lighting, telecommunication, or computer server applications. A three-phase PFC rectifier is configured to generate a rectified output voltage based on three alternating input voltages each received at a respective input. Furthermore, in order to control a power factor, a three-phase PFC rectifier is configured to control current waveforms (i.e., shapes as a function of time) of input currents received at the inputs such that, for example, the input currents have the same waveform as the input voltages. In one example, waveform as described herein indicates a respective shape (such as magnitude) as a function of time for a given signal being described.

The input voltages received at the inputs are grid voltages received from a power grid, for example. In many cases it is desirable to provide a galvanic isolation between the inputs where the alternating input voltages received and an output where the rectified output voltage is provided. A conventional three-phase PFC rectifier providing galvanic isolation between the input and the output may include two stages, a first stage configured to generate a rectified voltage (often referred to as a DC link voltage) based on the alternating input voltages, and a second stage configured to generate an output voltage based on the DC link voltage and to provide for a galvanic isolation between the first stage and the output. In this conventional three-phase PFC rectifier, the first stage usually includes three inductors and a DC link capacitor, and the second stage usually includes a transformer, an output capacitor and, optionally, an inductor in addition to the transformer. The inductors and the DC link capacitor are bulky and heavy and may take up to 50% of an overall size of the PFC rectifier.

The number of inductors can be reduced, and the DC link capacitor can be omitted when the three-phase PFC rectifier is implemented as a dual active bridge (DAB) cyclo-converter. This type of PFC rectifier, however, is difficult to control.

There is a need for a three-phase PFC converter that can be operated using a simplified control scheme.

One example relates to a method. The method comprises generating an alternating voltage based on three alternating input voltages received at an input of a power converter, wherein generating the alternating intermediate voltage comprises controlling waveforms of three input currents received at the input dependent on waveforms of the three alternating input voltages.

A further example is related to a control circuit. The control circuit is configured to control operation of a switching circuit in a power converter to generate an alternating voltage. The alternating voltage is based on three alternating input voltages which are received at an input of the power converter. The control circuit is further configured to control waveforms of three input currents received at the input dependent on waveforms of the three alternating input voltages.

BRIEF DESCRIPTION OF DRAWINGS

Examples are explained below with reference to the drawings. The drawings serve to illustrate certain principles, so that only aspects necessary for understanding these principles are illustrated. The drawings are not to scale. In the drawings the same reference characters denote like features.

FIGS. 19A-19M show different operating state of a switching circuit of the type illustrated in FIG. 18 in order to illustrate one example for operating the alternating intermediate voltage using the switching circuit.

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

DETAILED DESCRIPTION

Figure 1A:
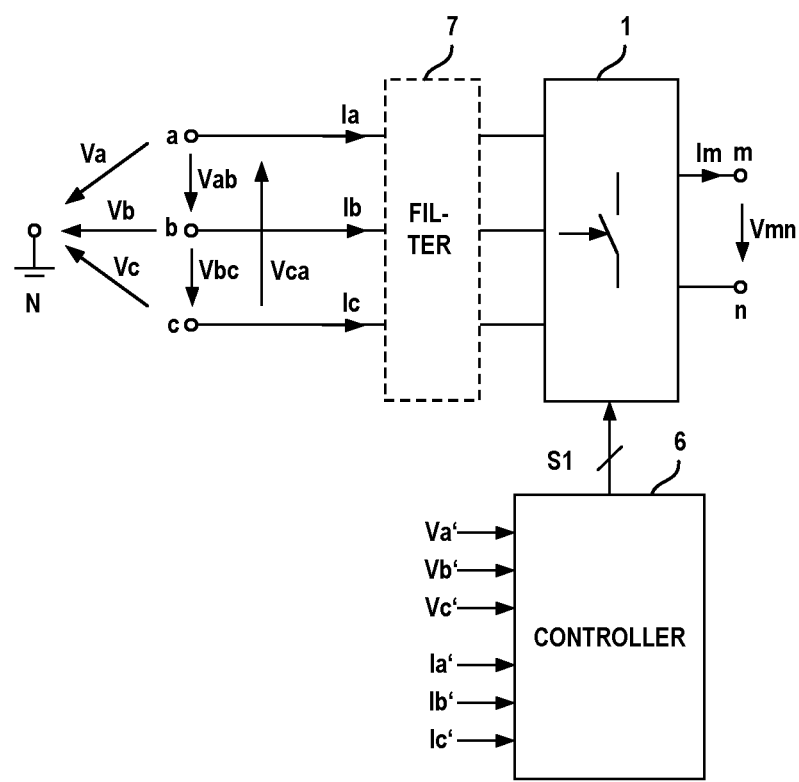
FIG. 1A illustrates one example of a three-phase power converter that includes a switching circuit configured to receive input voltages, and a control circuit configured to control operation of the switching circuit.

FIG. 1A illustrates one example of a power converter. The power converter includes an input a, b, c configured to receive input voltages Va, Vb, Vc and an output m, n configured to provide an output voltage Vmn. In one example, the output voltage Vmn is an alternating intermediate (AC) voltage. The input voltages Va, Vb, Vc are alternating input voltages (e.g., AC voltages) and the output voltage Vmn is an alternating intermediate voltage (AC or Alternating Current voltage) having a higher frequency than a frequency of the input voltages Va, Vb, Vc. According to one example, the power converter is a PFC converter which is a converter that is configured to control input currents Ia, Ib, Ic received at the input nodes a, b, c such that these input currents have predefined current waveforms that are dependent on voltage waveforms of the input voltages Va, Vb, Vc. According to one example, the input currents Ia, Ib, Ic are controlled such that the current waveforms are essentially proportional to the voltage waveforms of the input voltages Va, Vb, Vc. In the example illustrated in FIG. 1, the power converter includes three input nodes a, b, c, wherein each of these input nodes a, b, c, is configured to receive a respective alternating input voltage Va, Vb, Vc from a power supply. The alternating input voltages Va, Vb, Vc are referenced to a common circuit node N, such as ground. Note that alternating voltage as discussed herein means an AC voltage. An alternating current as discussed herein means an AC current.

Figure 2:
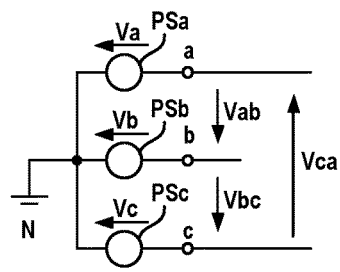
FIG. 2 illustrates one example of a power supply system configured to provide input voltages of the PFC converters according to FIGS. 1A and 1B.

FIG. 2 schematically illustrates one example of a power supply configured to provide alternating (such as AC) input voltages Va, Vb, Vc received at the input nodes a, b, c by the power converter. In this example, the power supply includes three power sources PSa, PSb, PSc each connected between a respective one of the three input nodes a, b, c and the common circuit node N, wherein each of these power sources PSa, PSb, PSc provides a respective one of the input voltages Va, Vb, Vc. The power supply is a 3-phase power grid, for example.

Figure 3:
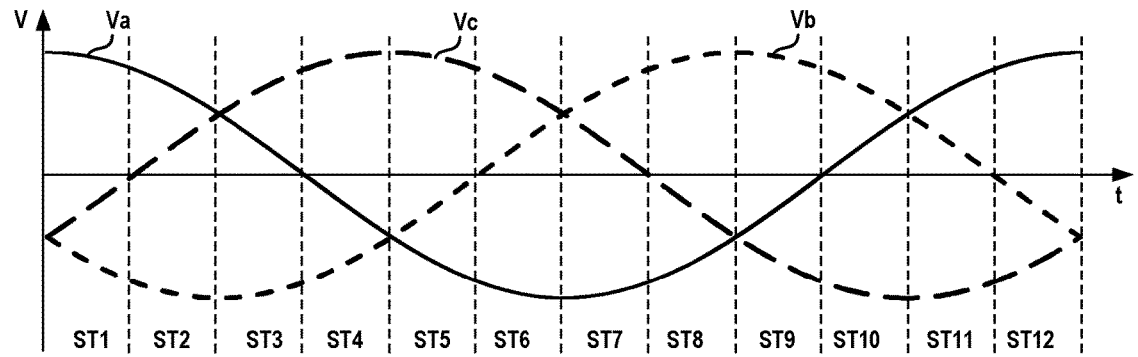
FIG. 3 shows signal waveforms of three sinusoidal input voltages.

FIG. 3 shows signal diagrams of three sinusoidal (AC) input voltages Va, Vb, Vc, which may be provided by a 3-phase power grid, during one period of each of these input voltages Va, Vb, Vc. Referring to FIG. 3, there is a phase shift between each pair of these input voltages Va, Vb, Vc, wherein the phase shift is 1200 (2π/3), for example. A frequency of the input voltages Va, Vb, Vc, which is the reciprocal of the duration of one period, is 50 Hz or 60 Hz, for example. An RMS (root mean square) value of the input voltages Va, Vb, Vc is 230 $V_{RMS}$ or 110 $V_{RMS}$, for example (wherein the three input voltages Va, Vb, Vc have the same RMS value). The amplitude of each of the input voltages Va, Vb, Vc is √2 times the RMS value. As can be seen from FIG. 3, each of the three sinusoidal input voltages Va, Vb, Vc periodically changes between a negative minimum voltage level and a positive maximum voltage level (such as above and below a respective 0 voltage value). The magnitude (absolute value) of the minimum voltage level equals the magnitude of the maximum voltage level and equals the amplitude.

Referring to the above, the input voltages Va, Vb, Vc are referenced to a common circuit node. Voltages between the input nodes a, b, c are referred to as line-to-line voltages in the following. Referring to FIG. 1, each pair of input voltages Va, Vb, Vc defines a line-to-line voltage Vab, Vbc, Vca, wherein $$Vab = Va - Vb\ Vbc = Vb - Vc\ Vca = Vc - Va \qquad (1a)$$

$$Vab = Va - Vb\ Vbc = Vb - \qquad (1b)$$

$$VcVca = Vc - Va$$

$$Vab = Va - Vb\ Vbc = Vb - VcVca = Vc - Va, \qquad (1c)$$

$$Vab = Va - Vb\ Vbc = Vb - VcVca = Vc - Va\ Vab = Va - Vb\ Vbc = Vb -$$

VcVca=Vc−Va and wherein there is exactly one line-to-line voltage associated with each pair of input voltages Va, Vb, Vc. Just for the purpose of illustration, the line-to-line voltages according to equations (1a)-(1c) are such that each of the input nodes a, b, c acts as a reference node for exactly one of the line-to-line voltages Vab, Vbc, Vca.

Figure 4:
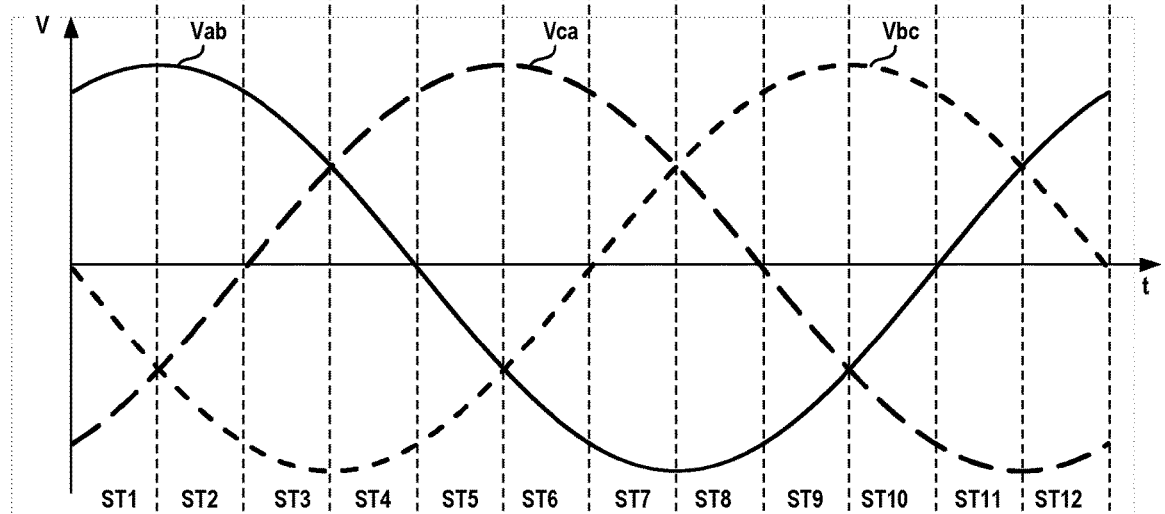
FIG. 4 shows signal waveforms of line-to-line voltage is based on the sinusoidal input voltages according to FIG. 3.

Signal diagrams of line-to-line voltages Vab, Vbc, Vca that are based on sinusoidal input voltages Va, Vb, Vc of the type illustrated in FIG. 3 are illustrated in FIG. 4. As can be seen from FIG. 4, the line-to-line voltages Vab, Vbc, Vca resulting from sinusoidal input voltages Va, Vb, Vc are also sinusoidal voltages that have the same frequency as the input voltages Va, Vb, Vc. The amplitude of the line-to-line voltages Vab, Vbc, Vca is √3 times the RMS value of the input voltages Va, Vb, Vc.

Referring to FIG. 1A, the power converter includes a switching circuit 1 that is coupled to the input nodes a, b, c so that the switching circuit 1 receives the input voltages Va, Vb, Vc and the line-to-line voltages Vab, Vbc, Vca. The switching circuit 1 is configured to generate the alternating output voltage Vmn based on the line-to-line voltages Vab, Vbc, Vca in a way explained in detail herein further below.

Figure 1B:
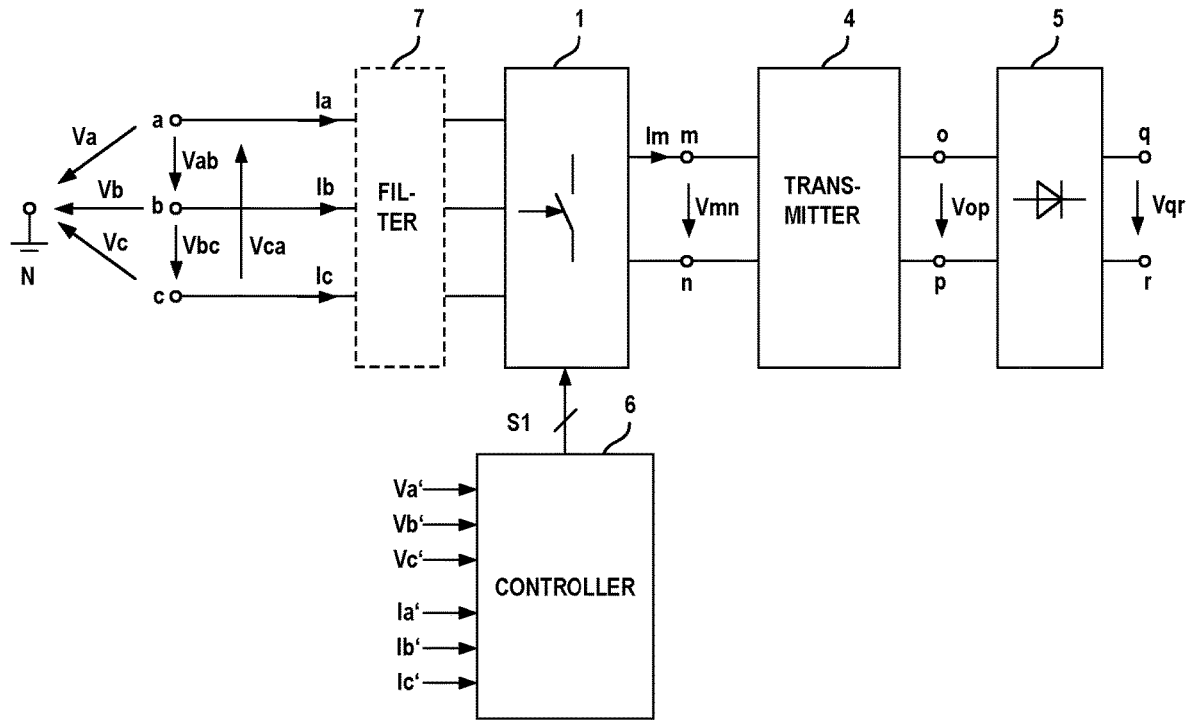
FIG. 1B illustrates a three-phase power converter of the type illustrated in FIG. 1A that further includes a transmitter circuit, a rectifier circuit configured to provide an output voltage.

Referring to FIG. 1B, the power converter may further include a transmitter circuit 4 configured to receive the alternating output voltage Vmn from the switching circuit 1. The transmitter circuit 4 includes an galvanic isolation barrier and is configured to transmit electric power associated with the alternating output voltage Vmn over a galvanic isolation barrier provided by the transmitter circuit 4. Transmitting power received from the input a, b, c (via the switching circuit 1) by the transmitter 4 is as associated with generating a further alternating voltage Vop at an output o, p of the transmitter circuit 4. A rectifier circuit 5 is configured to receive the further alternating voltage Vop and generate an output voltage Vqr based on the further alternating voltage Vop. According to one example, the output voltage Vq radio of the rectifier circuit 5 is a direct voltage. The power converter according to FIG. 1B may therefore be referred to as a PFC rectifier.

Furthermore, as illustrated in dashed lines in FIG. 1, the power converter may further include a filter 7 connected between the input a, b, c and the switching circuit 1. The filter 7 is configured to filter out high-frequency components of the input voltages and input currents that may result from a switched-mode operation of the switching circuit 1. An example of the filter 7 is explained in detail herein further below.

Referring to FIGS. 1A and 1B, the power converter further includes a control circuit 6 that is configured to control operation of the switching circuit 1 based on measured input voltages Va', Vb', Vc' and measured input currents Ia', Ib', Ic'. Each of the measured input voltages Va', Vb', Vc' represents a respective one of the input voltages Va, Vb, Vc. According to one example, each of the measured input voltages Va', Vb', Vc' is proportional to the respective input voltage Va, Vb, Vc. The measured input voltages Va', Vb', Vc' may be generated based on the input voltages Va, Vb, Vc using conventional voltage sensors (not illustrated). Such voltage sensors are commonly known, so that no further explanation is required in this regard. According to one example, the input voltages Va, Vb, Vc and input currents Ia, Ib, Ic are measured between the filter 7 and the switching circuit 1 in order to obtain the measured input voltages Va', Vb', Vc' and measured input currents Ia', Ib', Ic'.

Each of the measured input currents Ia', Ib', Ic' represents a respective one of the input currents Ia, Ib, Ic. According to one example, each of the measured input currents Ia', Ib', Ic' is proportional to the respective input current Ia, Ib, Ic. The measured input currents Ia', Ib', Ic' may be generated based on the input currents Ia, Ib, Ic using conventional current sensors (not illustrated). Such current sensors are commonly known, so that no further explanation is required in this regard.

The power converter is devoid of a feedback circuit between the output q, r and the control circuit 6, so that the control circuit 6 controls operation of the switching circuit 1 only based on input parameters (input voltages Va, Vb, Vc and input currents Ia, Ib, Ic) of the power converter. Thus, the power converter can be configured to not regulate the output voltage Vmn of the switching circuit 1. Consequently, in the power converter according to FIG. 1B the output voltage Vqr provided at the output q, r of the rectifier circuit 5 is not regulated in one example. The power converter according to FIG. 1A or 1B may may also be referred to as three-phase ACX converter (A: alternating C: current X: not regulated) converter.

Generating the alternating voltage Vmn includes controlling waveforms of the three input currents Ta, Ib, Ic dependent on waveforms of the input voltages Va, Vb, Vc in order to control the power factor.

Referring to FIG. 1B, the output voltage Vmn of the switching circuit 1 may be received by a circuit arrangement including the transmitter circuit 4 and the rectifier circuit 5 in order to convert the alternating output voltage Vmn of the switching circuit into the rectified output voltage Vqr of the power converter. This, however, is only an example. It is also possible that the alternating output voltage Vmn provided by the switching circuit 1 is directly received by an electric load.

According to another example (not illustrated), the output voltage Vmn of the switching circuit 1 is received by a rectifier circuit and an output voltage provided by the rectifier circuit based on the alternating output voltage Vmn is received by a load. In this example, the power converter does not include a galvanic isolation between the input nodes a, b, c and the output where the rectified voltage is available.

In the following, the alternating output voltage Vmn provided by the switching circuit is referred to as intermediate alternating voltage irrespective of whether the alternating output voltage Vmn is received by a second arrangement with a transmitter and a rectifier, by a rectifier, or directly by a load.

Figure 5:
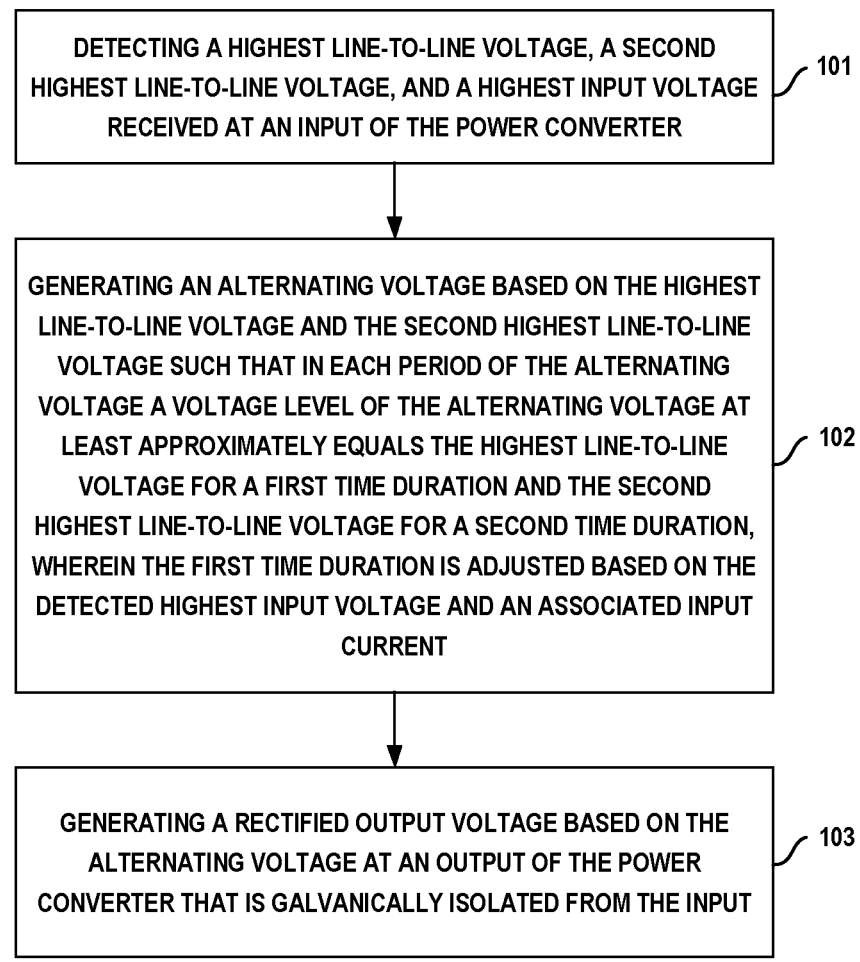
FIG. 5 illustrates one example of a method for operating the power converter according to FIG. 1.

FIG. 5 schematically illustrates one example of a method for generating the rectified output voltage Vqr based on the alternating input voltages Va, Vb, Vc using a power converter of the type illustrated in FIG. 1. Referring to FIG. 5, the method includes (see 101) detecting a highest line-to-line voltage, a second highest line-to-line voltage, and a highest input voltage received at the input a, b, c of the power converter. The highest line-to-line voltage, which is referred V12 in the following, is that line-to-line voltage that has the highest magnitude (absolute value) of the line-to-line voltages Vab, Vbc, Vca. The second highest line-to-line voltage, which is referred to as V13 in the following, is that line-to-line voltage that has the second highest magnitude (absolute value) of the line-to-line voltages Vab, Vbc, Vca. The highest input voltage, which is referred to as V1 in the following, is that input voltage that has the highest magnitude (absolute value) of the input voltages Va, Vb, Vc.

Referring to FIG. 5, the method further includes (see 102) generating the alternating intermediate voltage Vmn based on the highest line-to-line voltage V12 and the second highest line-to-line voltage V13 such that in each period of the alternating intermediate voltage Vmn a magnitude of the alternating intermediate voltage Vmn at least approximately equals the highest line-to-line voltage V12 for a first time duration and at least approximately equals the second highest line-to-line voltage V13 for a second time duration, wherein the first time duration is adjusted based on the detected highest input voltage V1 and the associated input current, which is referred to as I1 in the following. "The associated input current" is the input current received at the same input node at which the highest input voltage V1 is received. Examples for adjusting the first and second time durations based on the highest input voltage V1 and the associated input current I1 are explained herein further below.

The alternating intermediate voltage Vmn "at least approximately" being equal to the highest or second highest line-to-line voltage V12, V13 means that in an ideal case, in which there are no losses in the switching circuit 1 and in the filters 7, the alternating intermediate voltage Vmn equals the respective one of the highest or second highest line-to-line voltage V12, V13. In a real system, however, such losses may reduce the magnitude of the alternating intermediate voltage Vmn as compared to the magnitude of the respective one of the highest or second highest line-to-line voltage V12, V13. Thus, the magnitude of the alternating intermediate voltage Vmn equals the magnitude of the respective one of the highest or second highest line-to-line voltage V12, V13 minus inevitable losses in the switching circuit 1 and the filter 7.

In other words, generating the alternating intermediate voltage Vmn based on the highest line-to-line voltage V12 and the second highest line-to-line voltage V13 includes, in each period of the alternating intermediate voltage Vmn, connecting the intermediate nodes m, n to the input nodes receiving the highest line-to-line voltage V12 for the first time duration, and connecting the intermediate nodes m, n to the input nodes receiving the second highest line-to-line voltage V13 for the second time duration. The polarity of the alternating intermediate voltage can be adjusted by suitably selecting to which of the respective two input nodes the first intermediate node m and the second intermediate node n is to be connected.

Referring to FIGS. 5, the method further includes (see 103) generating the rectified output voltage Vqr based on the alternating intermediate voltage Vmn at the output q, r of the power converter, wherein the output q, r is galvanically isolated from the input a, b, c.

Figure 6:
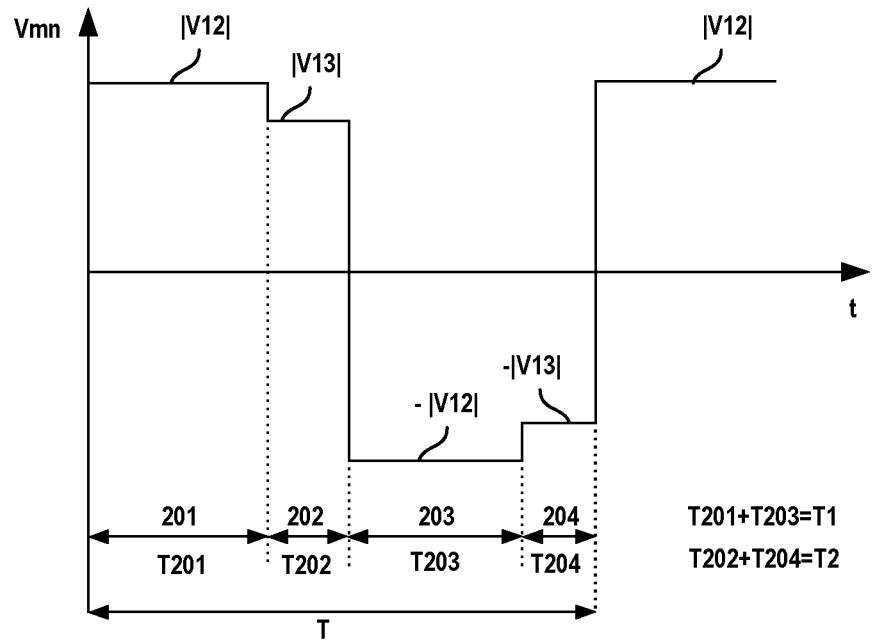
FIG. 6 illustrates one example of an alternating intermediate voltage generated by the switching circuit.

FIG. 6 schematically illustrates one example of the alternating intermediate voltage Vmn generated in accordance with the method according to FIG. 5. More specifically, FIG. 6 illustrates one period of the alternating intermediate voltage Vmn, wherein T denotes the duration of one period. The frequency f of the alternating intermediate voltage Vmn is the reciprocal of the duration T of one period, f=1/T. The frequency of the alternating intermediate voltage Vmn is much higher than the frequency of the alternating input voltages Va, Vb, Vc. According to one example, the frequency f of the alternating intermediate voltage Vmn is selected from between 100 kHz and 2 MHz, in particular from between 300 kHz and 1 MHz.

Referring to FIG. 6, each period of the alternating intermediate voltage Vmn has a positive half-period and a negative half-period. In the positive half-period, the alternating intermediate voltage Vmn is positive and, in the negative half-period, the alternating intermediate voltage Vmn is negative.

In the example illustrated in FIG. 6, the period of the alternating intermediate voltage Vmn has four time segments:
(a) a first time segment 201 in which the alternating intermediate voltage Vmn is positive and the magnitude equals the magnitude of the highest line-to-line voltage V12, so that Vmn=|V12|;
(b) a second time segment 202 in which the alternating intermediate voltage Vmn is positive and the magnitude equals the second highest line-to-line voltage V13, so that Vmn=|V13|;
(d) a third time segment 203 in which the alternating intermediate voltage Vmn is negative and the magnitude equals the highest line-to-line voltage V12, so that Vmn=−|V12|;
(e) a fourth time segment 204 in which the alternating intermediate voltage Vmn is negative and the magnitude equals the second highest line-to-line voltage V13, so that Vmn=−|V13|.

T1=T201+T203T2=T202+T204 Each of the four time segments 201-204 has a respective duration T201, T202, T203, T204. The overall time duration in which the magnitude of the alternating intermediate voltage Vmn, during one period, equals the highest line-to-line voltage V12 equals the first time duration T1, that is, the sum of the durations T201, T203 of the first and third time segments 201, 203 equals the first time duration T1, $$T1 = T201 + T203 T2 = T202 + T204 \qquad (2a)$$
$$T1 = T201 + T203 T2 = T202 + T204.$$
$$T1 = T201 + T203 T2 = T202 + T204$$

T1=T201+T203T2=T202+T204 Furthermore, the overall time duration in which the magnitude of alternating intermediate voltage Vmn, during one period, equals the second highest line-to-line voltage V13 equals the second time duration T2, that is, the sum of the durations T202, T204 of the second and fourth time segments 202, 204 equals the second time duration T2, $$T1 = T201 + T203 T2 = T202 + T204 \qquad (2a)$$
$$T1 = T201 + T203 T2 = T202 + T204.$$

T2=T−T1 It can be shown that by suitably adjusting the first and second time durations T1, T2, wherein $$T2 = T - T1 \qquad (3)$$
$$T2 = T - T1,$$
$$T2 = T - T1$$

T2=T−T1 a PFC functionality of the power converter can be achieved. This is explained in detail herein further below.

Figure 7:
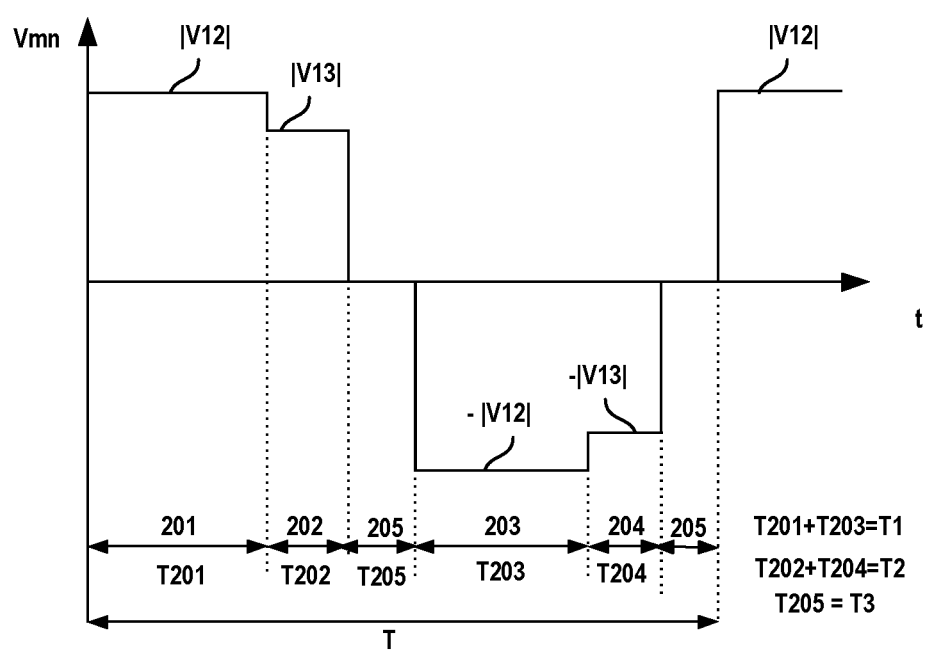
FIG. 7 illustrates another example of an alternating intermediate voltage generated by the switching circuit.

FIG. 7 illustrates one period of the alternating intermediate voltage Vmn according to another example. In the example according to FIG. 7, one period of the alternating intermediate voltage Vmn includes a fifth time segment 205 between the second and third time segments 202, 203 wherein the alternating intermediate voltage Vmn is zero in the fifth time segment. A duration T205=T3 of the fifth time segment 205 is much shorter than the first and second durations T1, T2, for example. According to one example, the duration T3 of the fifth time segment 205 is less than 200 nanoseconds (ns), or even less than 100 nanoseconds. According to another example, the duration T3 of the fifth time segment 205 is less than 10%, less than 5%, or even less than 1% of the duration T of one drive cycle. In the following, the fifth time period 205 is also referred to as a dead time between the positive and negative half-periods of one drive cycle.

T=T1+T2+2·T3 Referring to FIG. 7, one drive cycle includes two dead times, so that the overall duration T of one drive cycle is given by $$T = T1 + T2 + 2 \cdot T3 \qquad (4)$$
$$T = T1 + T2 + 2 \cdot T3.$$

T201=T203T202=T204 According to one example, the alternating intermediate voltage Vmn is devoid of a direct current (DC) offset, that is, a DC offset of the alternating intermediate voltage Vmn is zero. This can be achieved by generating the alternating intermediate voltage Vmn such that the time duration T201 in which the magnitude of the alternating intermediate voltage Vmn equals the magnitude |V12| of highest line-to-line voltage V12 during the positive half-period equals the time duration T203 in which the magnitude of the alternating intermediate voltage Vmn equals the magnitude |V12| of the highest line-to-line voltage V12 during the negative half-period, and such that the time duration T202 in which the magnitude of the alternating intermediate voltage Vmn equals the magnitude |V13| of the second highest line-to-line voltage V13 during the positive half-period equals the time duration T204 in which the magnitude of the alternating intermediate voltage Vmn equals the magnitude |V13| of the second highest line-to-line voltage V13 during the negative half-period. That is, in order to achieve a DC offset of zero of the alternating intermediate voltage Vmn, $$T201 = T203\,T202 = T204 \tag{5a}$$

$$T201 = T203\,T202 = T204$$

$$T201 = T203\,T202 = T204. \tag{5b}$$

As will be explained in detail herein further below, the transmitter circuit 4 includes a transformer. Generating the alternating intermediate voltage Vmn with a DC offset of zero may help to avoid saturation of the transformer during operation of the power converter.

In order to achieve a PFC functionality of the power converter it is sufficient to suitably adjust the first and second time durations T1, T2. A DC offset of zero is not necessary to achieve the PFC functionality.

Referring to FIG. 4, and as explained hereinabove, the line-to-line voltages Vab, Vbc, Vca are alternating voltages, which includes that the highest line-to-line voltage and the second highest line-to-line voltage change several times over one period of the line-to-line voltages Vab, Vbc, Vca (and the input voltages Va, Vb, Vc), wherein the highest line-to-line voltage is the same for a certain time period and the second highest line-to-line voltage is the same for a certain time period. More specifically, in an input voltage system that includes three sinusoidal input voltages with a mutual phase shift of 120° there are 12 different times segments in each period of the input voltage system such that during each of these 12 different times segments both the highest line-to-line voltage and the second highest line-to-line voltage do not change. These 12 different times segments are also referred to as states of the input voltage system and are labeled with ST1-ST12 in FIGS. 3 and 4. The duration of each of the 12 states ST1-ST12 is 30° (π/6) of one period of the input voltage system.

Figure 8:
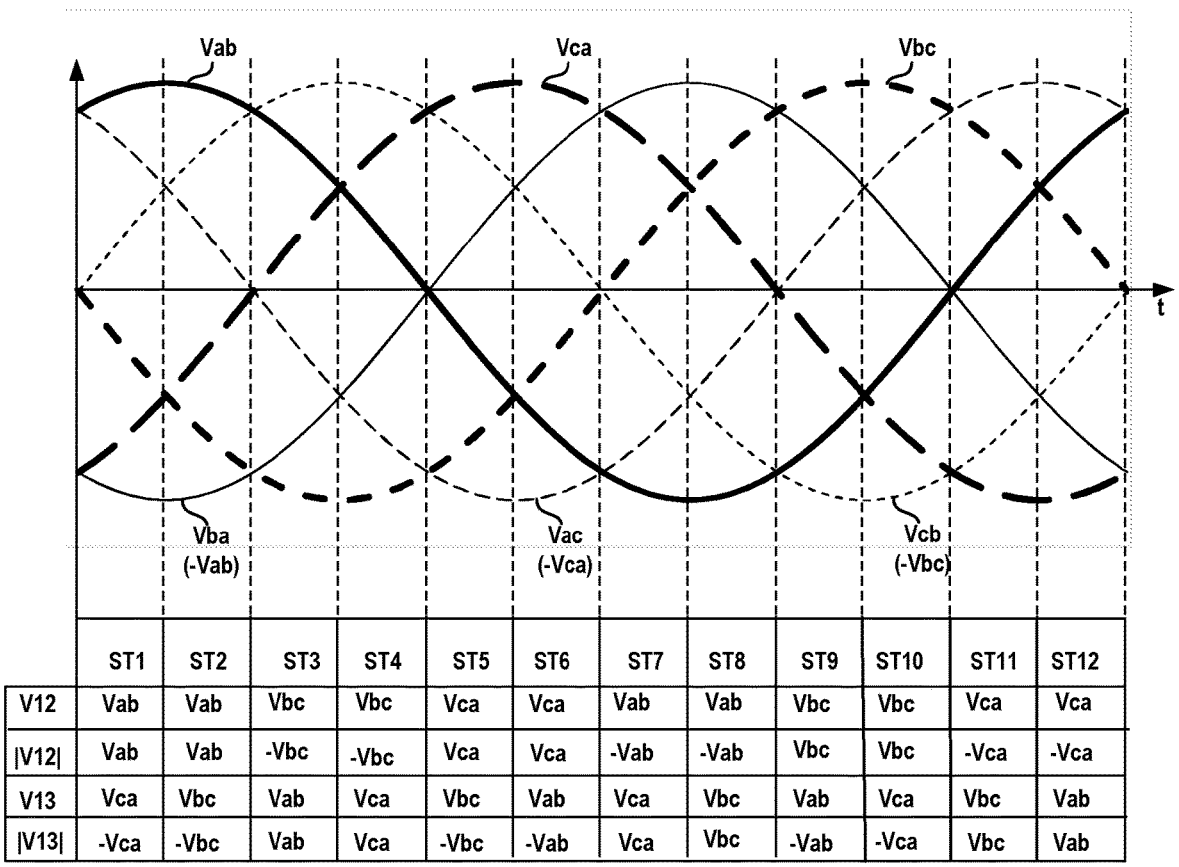
FIG. 8 illustrates different states of an input voltage system including three input voltages over one period of the input voltages.

−Vab=Vba−Vbc=Vcb−Vca=Vac In order to ease understanding which of the line-to-line voltages Vab, Vbc, Vca is the highest line-to-line voltage and the second highest line-to-line voltage at each time during one period of the line-to-line voltages Vab, Vbc, Vca, FIG. 8 illustrates the line-to-line voltage Vab, Vbc, Vca and the inverted line-to-line voltages $$-Vab = Vba - Vbc = Vcb - Vca = Vac \tag{6a}$$

$$-Vab = Vba - Vbc = Vcb - Vca = Vac$$

$$-Vab = Vba - Vbc = Vcb - Vca = Vac \tag{6b}$$

$$-Vab = Vba - Vbc = Vcb - Vca = Vac. \tag{6c}$$

Moreover, FIG. 8 includes a table that illustrates which of the line-to-line voltages Vab, Vbc, Vca is the highest line-to-line voltage and the second highest line-to-line voltage in each of the different states ST1-ST12. As can be seen from FIGS. 4 and 8, the highest line-to-line voltage V12 can be positive or negative and the second highest line-to-line voltage V13 can be positive or negative. FIG. 8 further illustrates how the magnitude |•| of the highest line-to-line voltage V12 and the second highest line-to-line voltage V13 can be achieved. If, for example, the highest line-to-line voltage V12 or the second highest line-to-line voltage V13 is negative, the respective highest line-to-line voltage V12 or second highest line-to-line voltage V13 has to be inverted in order to achieve the respective magnitude |V12|, |V13|.

In a first state ST1 of the input voltage system, for example, the highest line-to-line voltage V12 Is the first line-to-line voltage Vab, V12=Vab, and the third line-to-line voltage Vca is the second highest line-to-line voltage V13, V13=Vca. In the first state ST1, the first line-to-line voltage Vab is positive, so that the magnitude |V12| of the highest line-to-line voltage equals the first line-to-line voltage Vab, |V12|=Vab. The third line-to-line voltage Vca is negative in the first state ST1, so that the magnitude |V13| of the second highest line-to-line voltage equals the inverted third line-to-line voltage |V13|=−Vca.

In each of the 12 states ST1-ST12, the highest line-to-line voltage V12 and the second highest line-to-line voltage V13 have different signs. That is, one of the highest line-to-line voltage V12 and the second highest line-to-line voltage V13 is positive and the other one of the highest line-to-line voltage V12 and the second highest line-to-line voltage V13 is negative.

As can be seen from FIG. 8, the 12 states ST1-ST12 include six pairs of states such that each pair of states includes two states such that the highest line-to-line voltage is the same in the two states and the second highest line-to-line voltage is the same in the two states. These six pairs of states are: (ST1, ST7), (ST2, ST8), (ST3, ST9), (ST4, ST10), (ST5, ST11), (ST6, ST12). However, the two states in each of these pairs of states are different in that the highest line-to-line voltages in the two states have different signs and the second highest line-to-line voltages in the two states have different signs. That is, the highest line-to-line voltage in one of the two states is positive and the highest line-to-line voltage in the other one of the two states is negative, and the second highest line-to-line voltage in one of the two states is positive and the second highest line-to-line voltage in the other one of the two states is negative.

In the second state ST2 and the eighth state ST8, for example the first line-to-line voltage Vab is the highest line-to-line voltage V12 and the second line-to-line voltage Vbc is the second highest line-to-line voltage V13. However, the first line-to-line voltage Vab is positive in the second state ST2 and negative in the eighth state ST8, and the second line-to-line voltage Vbc is negative in the second state ST2 and positive in the eighth state ST8.

Thus, the 12 states of the input voltage system that occur during one period of the input voltage system are unique (mutually different). That is, only one of the 12 states includes a certain highest line-to-line voltage with a certain sign and a certain second highest line-to-line voltage with a certain sign.

Referring to the above, each period of the alternating intermediate voltage Vmn includes a positive half-period in which the voltage level is positive and a negative half-period in which the voltage level is negative. Furthermore, referring to the above, the highest line-to-line voltage V12 can be positive or negative and the second highest line-to-line voltage V13 can be positive or negative. In order to generate the alternating intermediate voltage Vmn based on the highest line-to-line voltage V12 and the second highest line-to-line voltage V13, the switching circuit 1 is configured to connect, at each time, either a non-inverted line-to-line voltage Vab, Vbc, Vca or an inverted line-to-line voltage Vab, Vbc, Vca to the input m, n of the transmitter 4. Examples for a switching circuit 1 having such functionality are explained herein further below.

Referring to the above, the 12 states of the input voltage system are unique. Thus, in each of these 12 states the switching circuit 1 can be operated in a predefined way in order to generate alternating intermediate voltage Vmn such that the magnitude of the alternating intermediate voltage equals the magnitude of the highest line-to-line voltage V12 for the first time duration T1 and equals the magnitude of the second highest line-to-line voltage V13 for the second time duration T2. Thus, according to one example, operating the switching circuit 1 by the controller 6 is based on detecting the respective state of the input voltage system and, each state, operating the switching circuit 1 in accordance with a predefined switching pattern.

It should be noted that the state of the input voltage system is not necessarily detected based on the line-to-line voltages Vab, Vbc, Vca. The state of the input voltage system can also be detected based on the input voltages Va, Vb, Vc. This can be seen from FIG. 3 in which the 12 states ST1-ST12 are also illustrated. In each of the 12 states ST1-ST12 one of the input voltages Va, Vb, Vc is the highest input voltage V1 and another one of the input voltages Va, Vb, Vc is the second highest input voltage V2, wherein the highest line-to-line voltage V1 and the second highest line-to-line voltage V2 have different signs (polarities). There are six pairs of states such that in each pair the same input voltage is the highest line-to-line voltage and the same input voltage is the second highest line-to-line voltage, wherein the two states of one pair are different in that the highest input voltage has different signs (polarities) in the two states and the second highest input voltage has different signs (polarities) in the two states.

In the first state ST1 and the seventh state ST7, for example, the first input voltage Va is the highest input voltage, V1=Va, and the second input voltage Vb is the second highest input voltage, V2=Vb. In the first state ST1, the first input voltage Va is positive and the second input voltage Vb is negative and, in the seventh state ST7, the first input voltage Va is negative and the second input voltage Vb is positive. Thus, based on detecting the highest input voltage and the second highest input voltage and based on detecting the sign (positive or negative) of the respective highest input voltage and the second highest input voltage the respective state of the input voltage system can unambiguously be detected.

Figure 9:
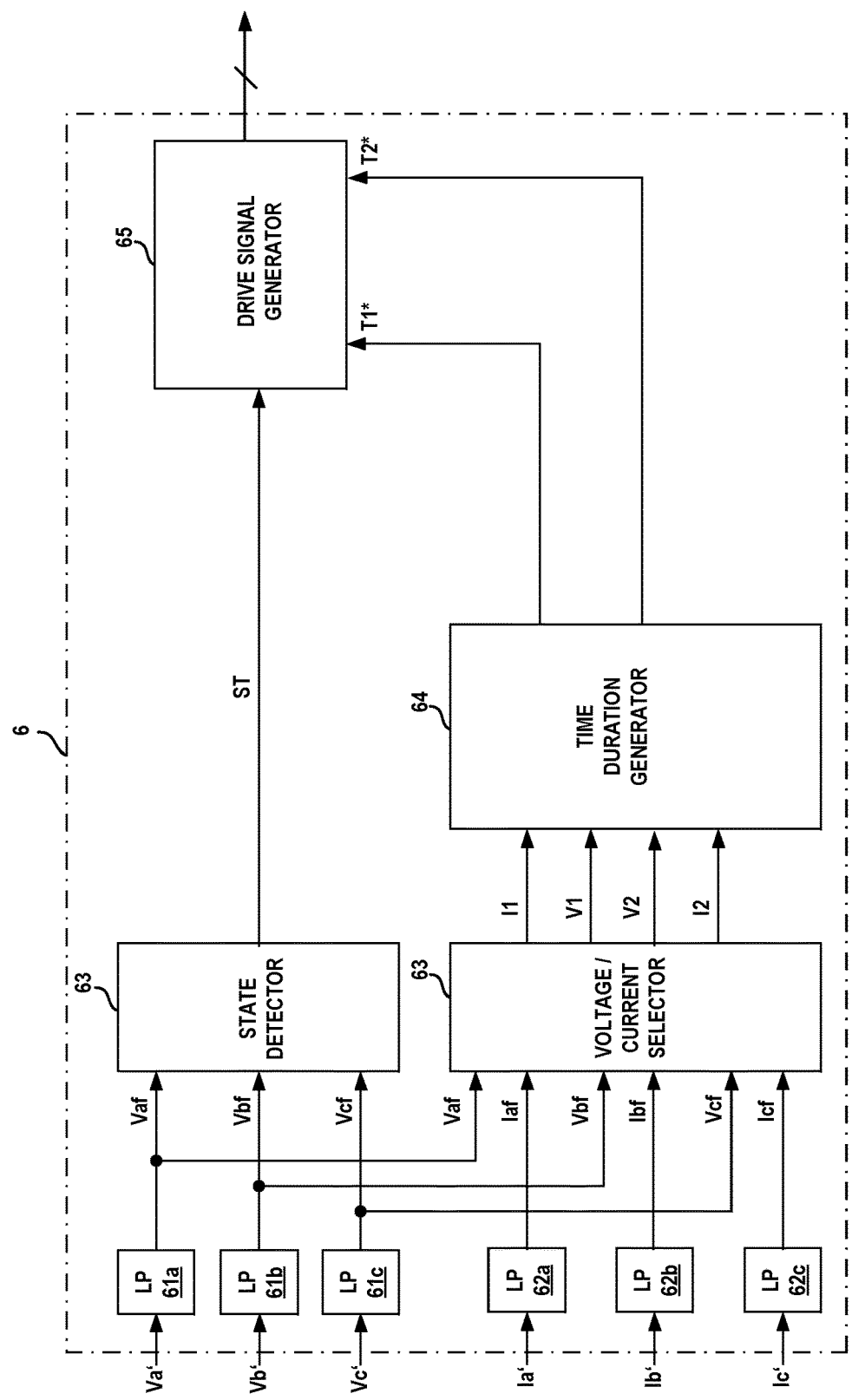
FIG. 9 shows a block diagram of the control circuit according to one example.

One example of a controller 6 that is configured to detect the state of the input voltage system and control operation of the switching circuit 1 in accordance with the detected state is illustrated in FIG. 9 and explained in the following.

FIG. 9 shows a block diagram of one example of the controller 6. It should be noted that the block diagram according to FIG. 9 illustrates the functionality rather than the implementation of the controller 6. The controller 6 may be implemented using dedicated circuitry. According to another example, the controller 6 may include a microcontroller that executes a software that is configured to operate a microcontroller in such a way that the functionality illustrated in FIG. 9 is implemented.

Referring to FIG. 9, the controller 6 receives the measured input voltages Va', Vb', Vc' and the measured input currents Ia', Ib', Ic'. Referring to the above, the switching circuit 1 operates at a much higher frequency than the input voltages in order to generate the alternating intermediate voltage Vmn. Such switched operation of the switching circuit 1 may cause voltage ripples of the input voltages Va, Vb, Vc and current ripples of the input currents Ia Ib, Ic. In order to prevent that such current and voltage ripples from negatively affecting operation of the power converter, the measured input voltages Va', Vb', Vc' are filtered by respective filters 61a, 61b, 61c to obtain filtered measured input voltages Vaf, Vbf, Vcf and the measured input currents Ia', Ib', Ic' are filtered by respective filters 62a, 62b, 62c to obtain filtered measured input currents Iaf, Ibf, Icf. The filters 61a, 61b, 61c, 62a, 62b, 62c are low-pass filters, for example. According to one example, the low-pass filters are configured to average the measured input currents Ia' Ib', Ic' and measured input voltages Va', Vb', Vc' over time durations that are between about one time and 100 times, in particular, between 10 times and 50 times the period T of the alternating intermediate voltage Vmn.

Referring to FIG. 9, a state detector 63 receives the filtered input voltages Vaf, Vbf, Vcf, which represents the input voltages Va, Vb, Vc, and detects the state of the input voltage system. That is, based on the filtered input voltages Vaf, Vbf, Vcf the state detector 63 detects the one of the 12 states the input voltage system is currently in. The state detector 63 may detect the state of the input voltage system in accordance with any of the examples explained herein before. In summary, these examples include (a) detecting, based on the filtered input voltages Vaf, Vbf, Vcf, the highest one of the input voltages Va, Vb, Vc and the respective polarity; detecting, based on the filtered input voltages Vaf, Vbf, Vcf, the second highest one of the input voltages Va, Vb, Vc and the respective polarity; and detecting the state based on the detected highest input voltage, the detected second highest input voltage and their respective polarities; (b) calculating, based on the filtered input voltages Vaf, Vbf, Vcf, the three line-to-line voltages Vab, Vbc, Vca; detecting the highest line-to-line voltage and the respective polarity; detecting the second highest line-to-line voltage and the polarity; and detecting the state based on the detected highest line-to-line voltage, the detected second highest line-to-line voltage, and the respective polarities; and (c) calculating, based on the filtered input voltages Vaf, Vbf, Vcf, the three line-to-line voltages Vab, Vbc, Vca and the respective inverted line-to-line voltages Vba, Vcb, Vac; detecting the highest positive line-to-line voltage and the second highest positive line-to-line voltage; and detecting the state based on the detected highest positive line-to-line voltage and the detected second highest positive line-to-line voltage period.

To illustrate example (c), reference is made to FIG. 8. Referring to the above, in the first state ST1, for example, the highest positive line-to-line voltage is the first line-to-line voltage Vab and the second highest line-to-line voltage is the third line-to-line voltage Vca. The first line-to-line voltage Vab is positive and the third line-to-line voltage Vca is negative, so that the highest positive line-to-line voltage is the first line-to-line voltage Vab and the second highest positive line-to-line voltage is the inverted third line-to-line voltage Vac (=−Vca). In the seventh state, the highest line-to-line voltage is also the first line-to-line voltage Vab and the second highest line-to-line voltage is also the third line-to-line voltage Vca, wherein the first line-to-line voltage Vab is negative and the third line-to-line voltage Vca is positive. Thus, the highest positive line-to-line voltage is the inverted first line-to-line voltage Vba (=−Vab) and the second highest positive line-to-line voltage is the third line-to-line voltage Vca. Thus, instead of detecting the highest and second highest line-to-line voltages and their respective polarities, as in example (b), the respective state of the input voltage system can also unambiguously be detected by calculating the three line-to-line voltages Vab, Vbc, Vca and the respective inverted line-to-line voltages Vba, Vcb, Vac and by detecting the highest and the second highest positive line-to-line voltage.

A state signal ST output by the state detector 63 represents the state of the input voltage system detected by the state detector 63. A drive signal generator 65 receives the state signal ST and receives a first time duration reference T1* and a second time duration reference T2* from a time duration generator 64. The first time duration reference T1* represents the desired first time duration T1, and the second time duration reference T2* represents the desired second time duration T2. The drive signal generator 65 is configured to drive the switching circuit 1 such that in each of the 12 state of the input voltage system, the alternating intermediate voltage Vmn is generated such that the magnitude of the intermediate voltage Vmn equals the magnitude of the highest line-to-line voltage V12 for the first time duration T1 and equals the magnitude of the second highest line-to-line voltage V13 for the second time duration T2.

Referring to FIG. 9, the time duration generator 64 receives a signal that represents the highest input voltage V1 and the associated input current I1. If, for example, the first input voltage Va is the highest input voltage, the associated input current is the input current Ia received at the first input a. Furthermore, the time duration generator 64 receives a signal that represents the second highest input voltage V2 and the associated input current I2, which is the current received at the same input node at which the second highest input voltage V2 is received.

The signal representing the highest input voltage V1, the associated input current I1, the second highest input voltage V2, and the associated input current I2 are provided by a voltage/current selector 66 based on the filtered input voltages Vaf, Vbf, Vcf and the fitted input currents Iaf, Ibf, Icf. The time duration generator 64 is configured to generate the first and second time duration references T1*, T2* based on the highest and second highest input voltage V1, V2 and the associated input currents I1, I2.

Figure 10A:
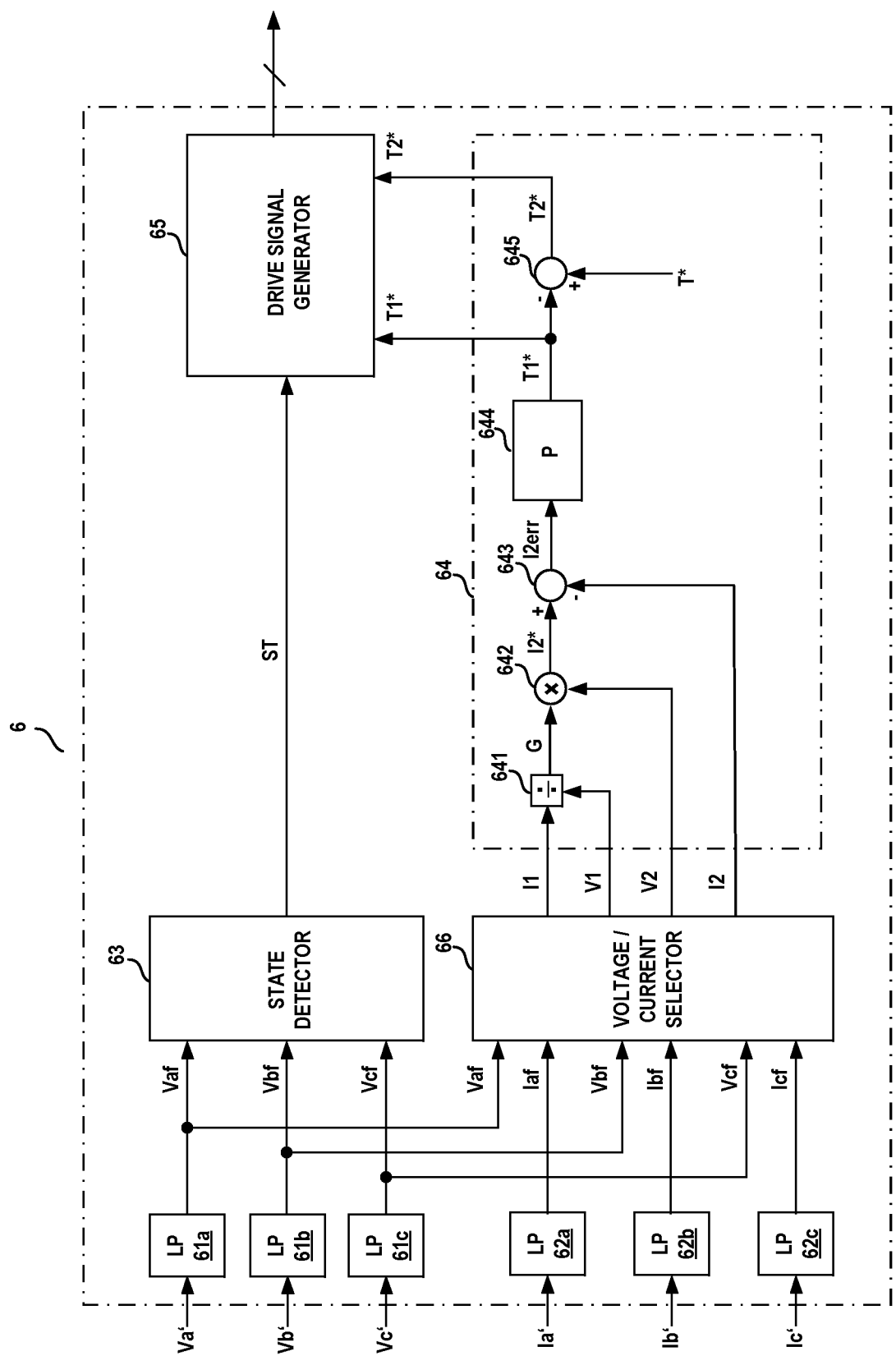
FIGS. 10A and 10B show block diagrams of two different examples of the control circuit according to FIG. 9 in greater detail.

FIG. 10A illustrates one example of the time duration generator 64 in greater detail. In this example, the time duration generator 64 calculates, using a divider 641, a quotient I1/V1 of the input current I1 associated with the highest input voltage V1 and the highest input voltage V1, wherein such quotient represents a conductance G (=I1/V1) of the power converter at the input at which the highest input voltage V1 is received. Based on this conductance G the time duration generator 64 calculates an input current reference I2* of the input current I2 associated with the second highest input voltage V2. The input current reference I2* of the current I2 as associated with the second highest input voltage V2 represents the desired input current at that input node that receives the second highest input voltage V2. In the example illustrated in FIG. 10A, the input current reference I2* is given by the conductance G multiplied with the signal representing the second highest input voltage V2 and is calculated by a multiplier 642 that receives the conductance and G the signal representing the second highest input voltage V2.

Referring to FIG. 10A, the time duration generator 64 further calculates an error signal I2err that represents a difference between the desired second highest input current I2* and the second highest input current I2, I2err=I2*−I2. For this, the time duration generator 64 includes a subtractor 643 that receives the signal representing the desired second highest input current I2*and the signal representing the second highest input current I2. A controller 644 receives the error signal I2err and generates the first time duration reference T1* based on the error signal I2err. The controller 644 is a proportional controller with a constant offset (P+C controller), for example. In this example, the first time duration reference T1* is given by the offset plus a proportional component that is proportional to the error signal I2err.

Furthermore, the time duration generator 64 calculates the second time duration reference T2* based on the first time duration reference T1* and a time duration reference T* representing the desired duration of one period of the alternating intermediate voltage Vmn. In the example illustrated in FIG. 10A, the second time duration reference T2* is calculated by a subtractor 645 that subtracts the first time duration reference T1* from the time duration reference T* representing the desired duration of one period of the alternating intermediate voltage Vmn.

$$T1\text{mod}^* = \frac{T1*}{T-2\cdot T3} T2\text{mod}^* = \frac{T2*}{T-2\cdot T3}$$

Referring to FIG. 7, there may be a dead time 205 between the positive and negative half-periods of the drive cycle. In this example, first and second time duration references T1*, T2* may be calculated as explained with reference to FIG. 10A. In this example, however, drive signal generator receives a modified first time duration reference T1mod* and a modified second time duration reference T1mod*, which are given by $$T1\text{mod}^* = \frac{T1*}{T-2\cdot T3} T2\text{mod}^* = \frac{T2*}{T-2\cdot T3} \quad (7a)$$

$$T1\text{mod}^* = \frac{T1*}{T-2\cdot T3} T2\text{mod}^* = \frac{T2*}{T-2\cdot T3}$$

$$T1\text{mod}^* = \frac{T1*}{T-2\cdot T3} T2\text{mod}^* = \frac{T2*}{T-2\cdot T3} \quad (7b)$$

$$T1\text{mod}^* = \frac{T1*}{T-2\cdot T3} T2\text{mod}^* = \frac{T2*}{T-2\cdot T3} \cdot$$

$$T1\text{mod}^* = \frac{T1*}{T-2\cdot T3} T2\text{mod}^* = \frac{T2*}{T-2\cdot T3}$$

In this example, the modified first time duration reference T1mod* defines the first time duration T1, and the modified second time duration reference T2mod* defines the second time duration. Furthermore, the drive signal generator 65 receives a third time duration reference T3* that defines the time duration T3 of each of the dead times.

Figure 10B:
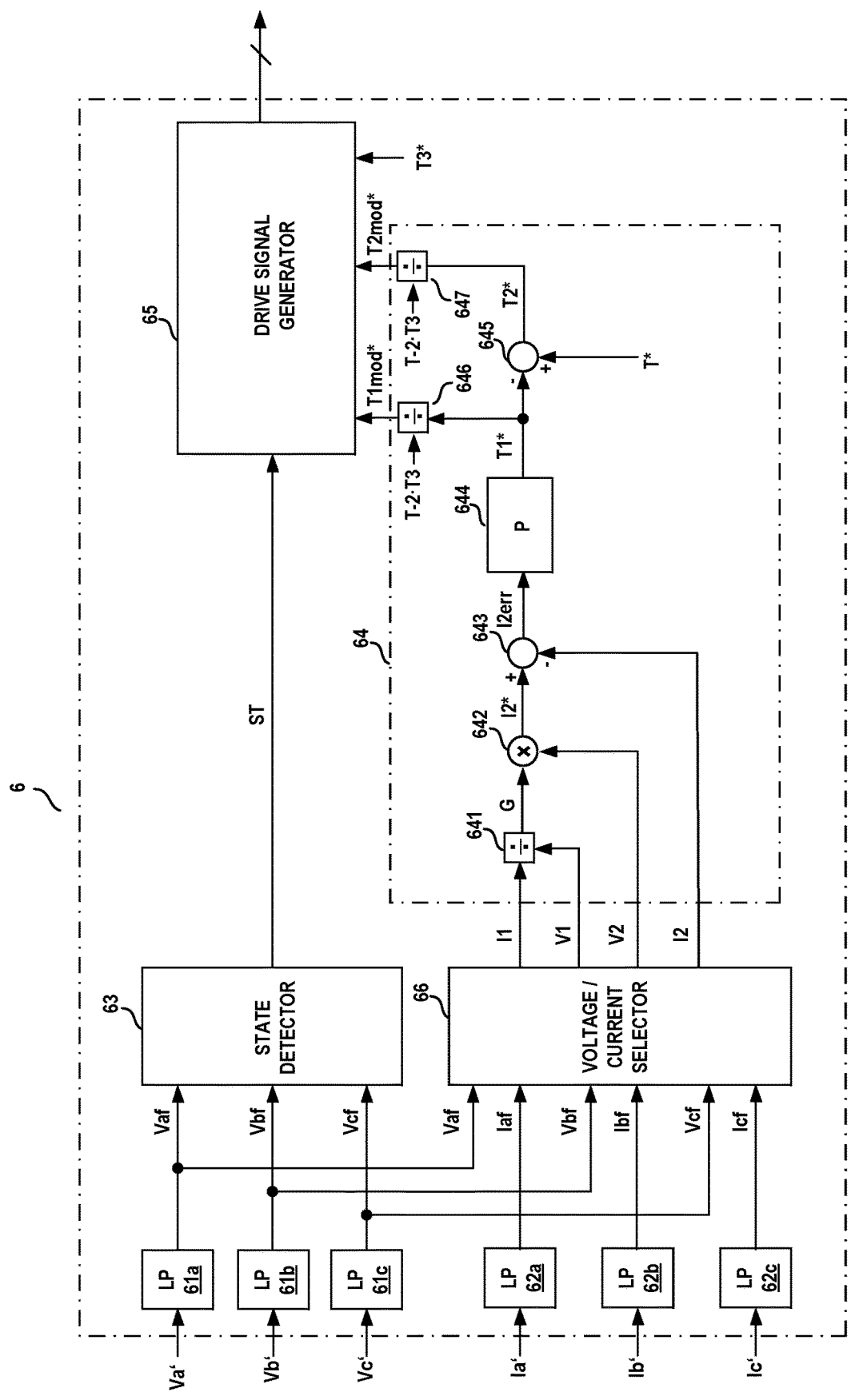

A control circuit 6 that generates in accordance with this example is illustrated in FIG. 10B. The control circuit 6 illustrated in FIG. 10B is based on the control circuit illustrated in FIG. 10A and additionally includes dividers 646, 647 that divide the first and second time duration references T1*, T2* by T−2·T3 so as to obtain the modified first and second time duration references T1mod*, T2mod* received by the drive signal generator 65. In addition to the modified first and second time duration references T1mod*, T2mod*, the drive signal generator receives a third time duration reference T3* that indicates the desired duration of the data times between the positive and negative half-periods of the alternating intermediate voltage Vmn.

As can be seen from FIGS. 3, 4 and 8, in each of the 12 states ST1-ST12 the highest line-to-line voltage and the second highest line-to-line voltage remains the same throughout the respective state. Furthermore, in each of these 12 states ST1-ST12, the highest line-to-line voltage is the voltage between the input node receiving the highest input voltage and the input node receiving the second highest input voltage, and the second highest line-to-line voltage is the voltage between the input node receiving the highest input voltage and the input node receiving the lowest (third highest) input voltage V3. During the first time duration T1, in which the highest line-to-line voltage V12 is provided to the input nodes m, n of the transmitter circuit 4, a current flows between the circuit node receiving the highest input voltage V1 and the circuit node receiving the second highest input voltage V2. During the second time duration T2, in which the second highest line-to-line voltage V13 is provided to the input nodes m, n of the transmitter circuit 4, a current flows between the second node receiving the highest input voltage V1 and the circuit node receiving the lowest input voltage.

Thus, during the first time duration T1 as well as during the second time duration T2 an input current flows at the input node receiving the highest input voltage V1, wherein this current flows between the input node receiving the highest input voltage V1 and the input node receiving the second highest input voltage V2 during the first time duration T1 and between the input node receiving the highest input voltage V1 and the input node receiving the lowest input voltage V3 during the second time duration T2. The input current I1 flowing at the input node receiving the highest input voltage V1 and the highest input voltage V1 therefore define the conductance G based on which the input current I2 at the input node receiving the second highest input voltage V2 is adjusted. That is, the current I2 received at the input receiving the second highest input voltage V2 is modulated based on the highest input voltage V1 and the current I1 associated with the highest input voltage V1.

In the first state ST1, for example the highest input voltage V1 is the first input voltage Va received at the first input a, the second highest input voltage V2 is the second input voltage Vb received at the second input b, and the lowest input voltage V3 is the third input voltage Vc received at the third input c. Furthermore, in the first state ST1, the highest line-to-line voltage V12 is the first line-to-line voltage Vab, which is the voltage between the first input node a and the second input node b, and the second highest line-to-line voltage V13 is the third line-to-line voltage Vca, which is the voltage between the third input node c and the first input node a. Providing the highest line-to-line voltage V12 to the input nodes m, n of the transmitter circuit 4 therefore includes connecting the first and second input nodes a, b to the input nodes m, n of the transmitter circuit 4, and providing the second highest line-to-line voltage V13 to the input nodes m, n of the transmitter circuit 4 therefore includes connecting the first and third input nodes a, c to the input nodes m, n of the transmitter circuit 4. Thus, in the first state ST1, the first input node a is continuously connected to one of the input nodes m, n of the transmitter circuit 4, wherein each of the second and third input nodes b, c is connected to one of the input nodes m, n of the transmitter circuit 4 only for a respective portion of one period of the alternating intermediate voltage Vmn. More specifically, the second input node b is connected to one of the input nodes m, n for the first time duration T1, and the third input node c is connected to 1 of the input nodes m, n for the second time duration T2. Thus, the input current Ia at the first input node a flows throughout the first state ST1, wherein the current Ia received at the first input node a is modulated between the second and third input nodes b, c during the first state ST1.

Figure 11:
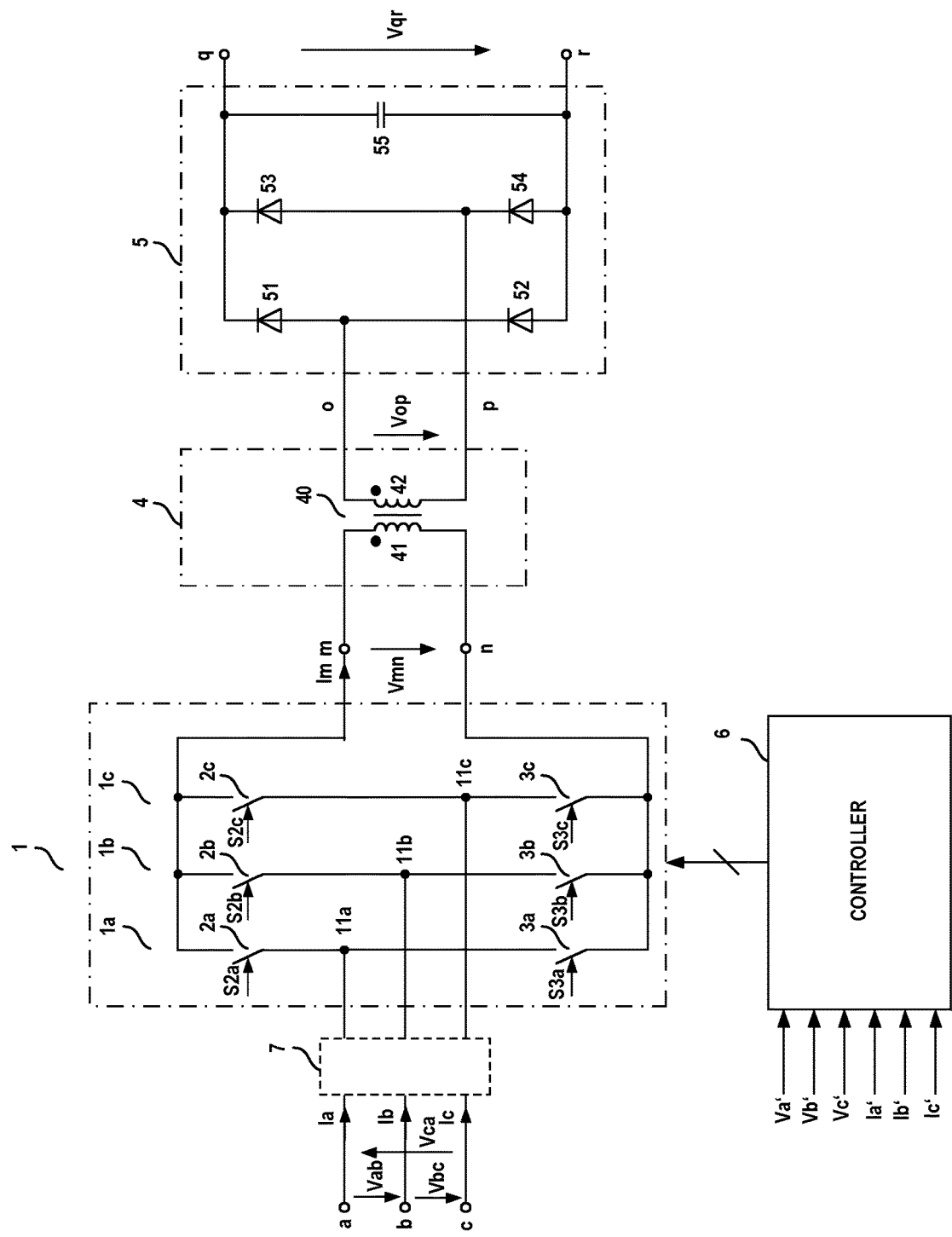
FIG. 11 illustrates examples of the switching circuit, the transmitter circuit, and the rectifier circuit of the power converter according to FIG. 1.

FIG. 11 illustrates examples of the switching circuit 1, the transmitter circuit 4, and the rectifier circuit 5 in greater detail. In the example illustrated in FIG. 11, the switching circuit 1 includes three half-bridges 1a, 1b, 1c that each include a switched node 11a, 11b, 11c, a first switch 2a, 2b, 2c, and a second switch 3a, 3b, 3c. The switched node of each of the three half-bridges 1a, 1b, 1c is connected to a respective one of the three input nodes a, b, c. The first switch 2a, 2b, 2c of each of the three half-bridges 1a, 1b, 1c is connected between the respective switched node 11a, 11b, 11c and a first one m of the input nodes m, n of the transmitter circuit 4, and the second switch 3a, 3b, 3c of each of the three half-bridges 1a, 1b, 1c is connected between the respective switched node 11a, 11b, 11c and a second one n of the input nodes m, n of the transmitter circuit 4. Each of the first and second switches 2a, 2b, 2c, 3a, 3b, 3c is configured to switch on or off dependent on a drive signal S2a, S2b, S2c, S3a, S3b, S3c received by the respective switch 2a, 2b, 2c, 3a, 3b, 3c. The drive signals S2a, S2b, S2c, S3a, S3b, S3c are generated by the controller 6 in order to control operation of the switching circuit 1.

The switching circuit 1 according to FIG. 11 is implemented such that each of the input nodes a, b, c of the power converter can be connected to each of the input nodes m, n of the transmitter circuit 4. In this way, each of the line-to-line voltages Vab, Vbc, Vca and each of the inverted line-to-line voltages Vba, Vcb, Vac can be provided to the input m, n of the transmitter circuit 4 in order to generate the alternating intermediate voltage Vmn. In order to provide the first line-to-line voltage Vab available between the first and second input nodes a, b to the input m, n of the transmitter circuit 4, for example, the controller 6 switches on the first switch 2a of the first half-bridge 1a that has its switched node 11a connected to the first input node a and switches on the second switch 3b of the second half-bridge 1b that has its switched node 11b connected to the second input node b, so that the first input node a of the power converter is connected to the first input node m of the transmitter circuit 4 and the second input node b of the power converter is connected to the second input node n of the transmitter circuit 4. In order to provide the inverted first line-to-line voltage Vba available between the first and second input nodes a, b to the input m, n of the transmitter circuit 4, the controller 6 switches on the second switch 3a of the first half-bridge 1a and switches on the first switch 2b of the second half-bridge 1b, so that the first input node a of the power converter is connected to the second input node n of the transmitter circuit 4 and the second input node b of the power converter is connected to the first input node m of the transmitter circuit 4. In the same way, each of the other two line-to-line voltages Vbc, Vca and their respective inverted line-to-line voltages Vcb, Vac can be provided to the input m, n of the transmitter circuit 4.

In the example illustrated in FIG. 11, the transmitter circuit 4 only includes a transformer 40 with a primary winding 41 and a secondary winding 42. The primary winding 41 is connected between the input nodes m, n of the transmitter circuit 4, so that the primary winding 41 receives the alternating intermediate voltage Vmn. The secondary winding 42 is inductively coupled with the primary winding 41. According to one example, the primary winding 41 and the secondary winding 42 have the same winding sense, so that, at the secondary winding 42, a voltage Vop is available that is essentially proportional to the voltage across the primary winding 41, wherein a proportionality factor between the voltage Vop across the secondary winding 42 and the voltage across the primary winding 41 is given by a ratio Ns/Np between the number of turns Ns of the secondary winding 42 and the number of turns Np of the primary winding 41.

The turns ratio Ns/Np may be such that the voltage Vop across the secondary winding 42 is lower than the voltage across the primary winding 41. In this example, the power converter operates as a step down converter. According to one example, the number of turns of the secondary winding 42 and the primary winding 41 are adapted to one another such that the voltage Vop across the secondary winding is between ½ and ¹⁄₂₀ of the voltage across the primary winding 41. That is, the number of turns Np of the primary winding 41 is between 2 times and 20 times the number of turns Ns of the secondary winding 42.

According to another example, the turns ratio Ns/Np is such that the voltage Vop across the secondary winding 42 is higher than the voltage across the primary winding 41. In this example, the power converter operates as a step up converter. According to one example, the number of turns of the secondary winding 42 and the primary winding 41 are adapted to one another such that the voltage Vop across the secondary winding is between 2 times and 20 times of the voltage across the primary winding 41. That is, the number of turns Np of the primary winding 41 is between ½ and ¹⁄₂₀ of the number of turns Ns of the secondary winding 42.

According to yet another example, the turns ratio Ns/Np is 1/1, so that the primary winding 41 and the secondary winding 42 have the same number of turns. In this example, the transmitter circuit 4 merely serves to galvanically isolate the output q, r from the input a, b, c.

The rectifier circuit 5 is configured to rectify the alternating voltage Vop provided by the secondary winding 42. Just for the purpose of illustration, the rectifier circuit 5 according to FIG. 11 is a passive rectifier that includes a rectifier bridge with four passive rectifier elements 51-54, such as diodes, and a capacitor 55 connected between the output nodes q, r.

Figure 12:
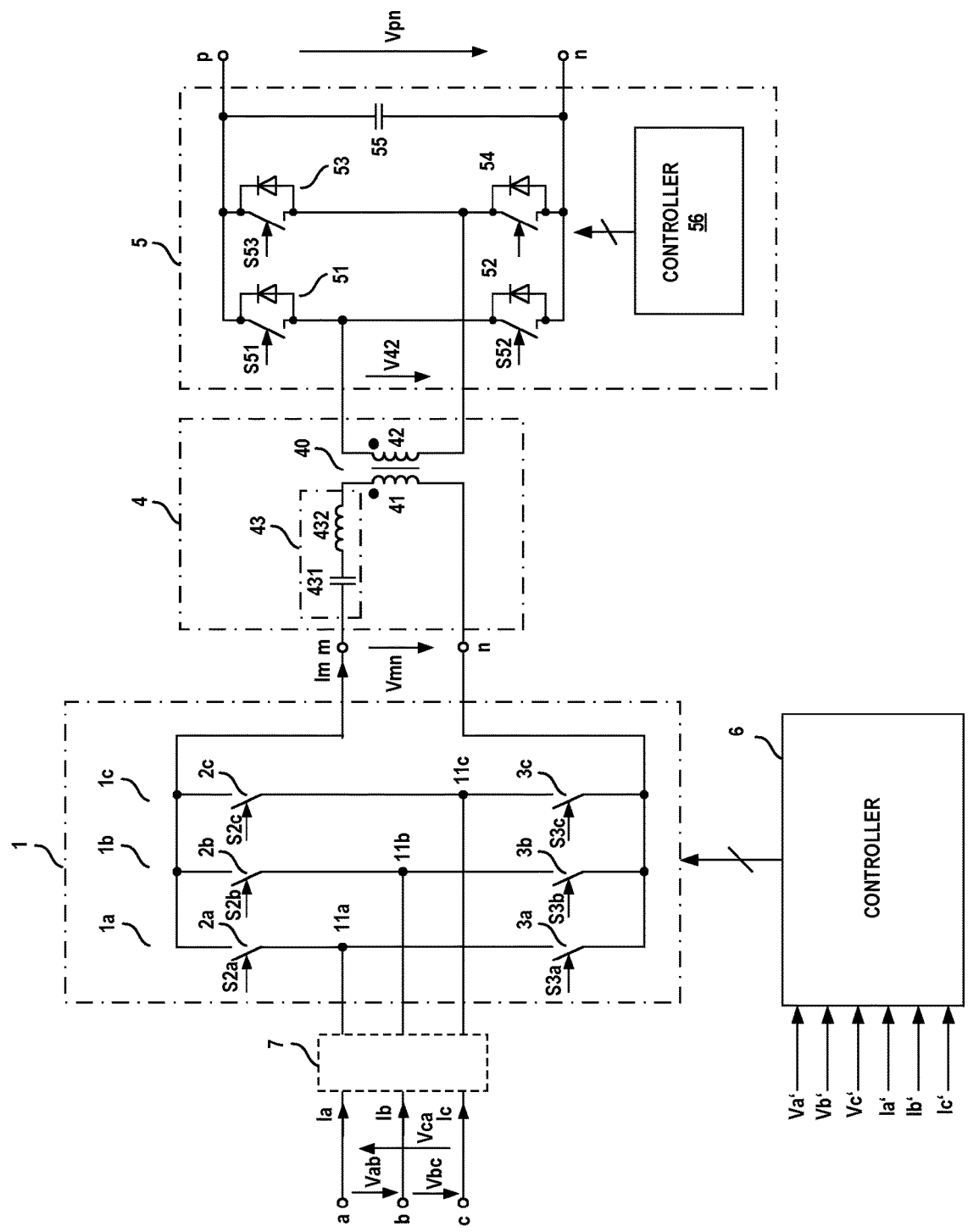
FIG. 12 illustrates a power converter of the type illustrated in FIG. 1 with a different transmitter circuit and a different rectifier circuit.

FIG. 12 illustrates a modification of the power converter according to FIG. 11. In the power converter according to FIG. 12, the transmitter circuit 4 includes a resonant circuit 43 connected in series with the primary winding 41 of the transformer 40. In this example, the alternating intermediate voltage Vmn is received by a series circuit including the resonant circuit 43 and the primary winding 41 of the transformer 40. Like in the example according to FIG. 11, the voltage Vop across the secondary winding 42 is proportional to the voltage across the primary winding 41. The voltage across the primary winding 41, however, is different from the alternating intermediate voltage Vmn in the example according to FIG. 12.

The resonant circuit 43 includes a capacitor 431 connected in series with an inductor 432. The inductor 432 can be a discrete inductor connected in series with the primary winding 41. According to another example, the inductor 432 is formed by the primary winding 401 and is formed by a parasitic inductance of the transformer 40.

fres<f<2·fres The resonant circuit 43 has a resonant frequency. According to one example, the alternating intermediate voltage Vmn is generated such that its frequency is higher than the resonant frequency of the resonant circuit 43. According to one example, the alternating intermediate voltage Vmn is generated such that it is frequency is higher than the resonant frequency of the resonant circuit 4 and lower than twice the resonant frequency of the resonant circuit 43, that is, $$fres < f < 2 \cdot fres$$
$$fres < f < 2 \cdot fres,$$ (7)
$$fres < f < 2 \cdot fres$$

fres<f<2·fres where f denotes the frequency of the alternating intermediate voltage Vmn, and fres denotes the resonant frequency of the resonant circuit 4.

Furthermore, in the power converter according to FIG. 12, the rectifier circuit 5 includes active rectifier elements 51-54 instead of passive rectifier elements, wherein these active rectifier elements are controlled by a rectifier controller 56. Each of the active rectifier elements 51-54 may include an electronic switch and a passive rectifier element, such as a diode, connected in parallel with the respective electronic switch. The rectifier controller 56 is configured to control the electronic switches of the active rectifier elements. According to one example, the controller 56 is configured to detect whether the passive rectifier element of the respective active rectifier element is in a forward biased (conducting) or a reverse biased (blocking) state and is configured to switch on those electronic switches that are connected in parallel to a forward biased passive rectifier element. It should be noted that a rectifier circuit 5 with active rectifier elements may be used in the power converter 5 according to FIG. 11 accordingly.

Figure 13:
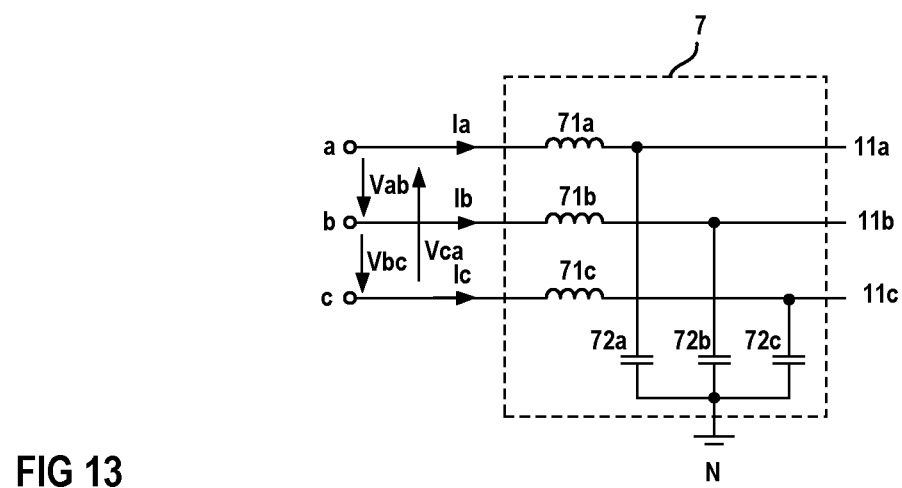
FIG. 13 illustrates one example of an optional filter of the power converter.

For the sake of completeness, FIG. 13 illustrates one example of the filter 7. In this example, the filter 7 includes three inductors 71a, 71b, 71c, wherein each of these inductors 71a, 71b, 71c is connected between a respective one of the input nodes a, b, c and the respective switched node 11a, 11b, 11c. Furthermore, a capacitor 72a, 72b, 72c is connected between each switched node 11a, 11b, 11c and the reference node N. Implementing the filter 7 as illustrated in FIG. 13, however, is only an example. Any other type of filter may be used as the filter 7 in the power converter as well.

Figure 14:
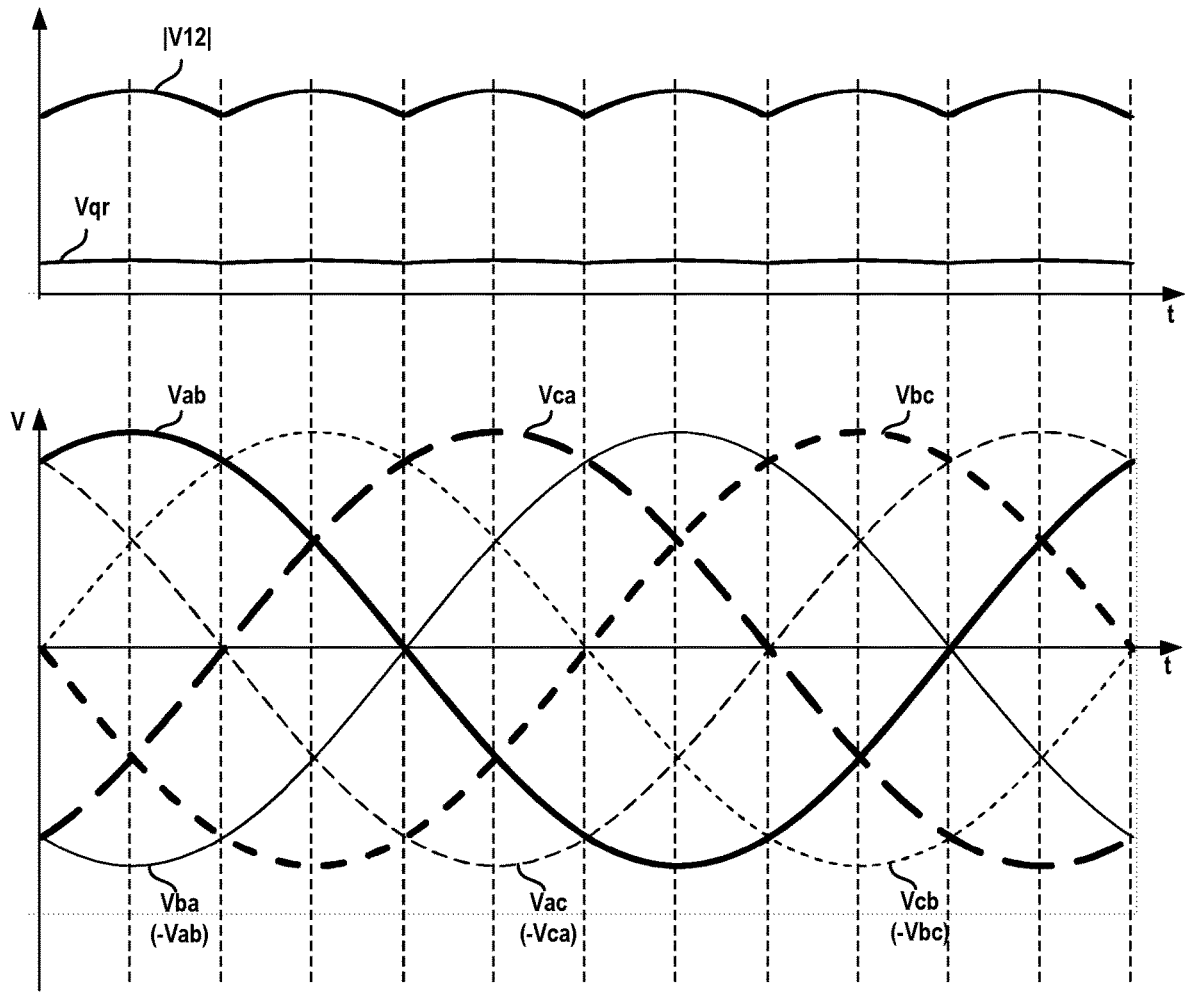
FIG. 14 shows signal waveforms to illustrate one example of the output voltage.

Operating the power converter explained hereinabove results in an output voltage Vqr of the type illustrated in FIG. 14, wherein FIG. 14 shows a signal waveform of the output voltage Vqr over one period of the input voltage system. For the purpose of illustration, the line-to-line voltages Vab, Vbc, Vca and their respective inverted line-to-line voltages Vba, Vcb, Vac are also illustrated in FIG. 14.

The line-to-line voltages Vab, Vbc, Vca, in each period of the input voltage system, define a six-pulse waveform. This six-pulse waveform, at each time, is defined by the magnitude |V12| of the instantaneously highest line-to-line voltage V12. The six-pulse waveform resulting from the line-to-line voltages Vab, Vbc, Vca are also illustrated in FIG. 14.

The output voltage Vqr is proportional to this six-pulse waveform, wherein the proportionality factor is given by the turns ratio Ns/Np of the transformer 40. According to one example (not illustrated) a DC-DC converter receives the output voltage Vqr of the power converter and is configured to generate an essentially constant voltage based on the pulsating output voltage Vqr provided by the power converter.

Figure 15:
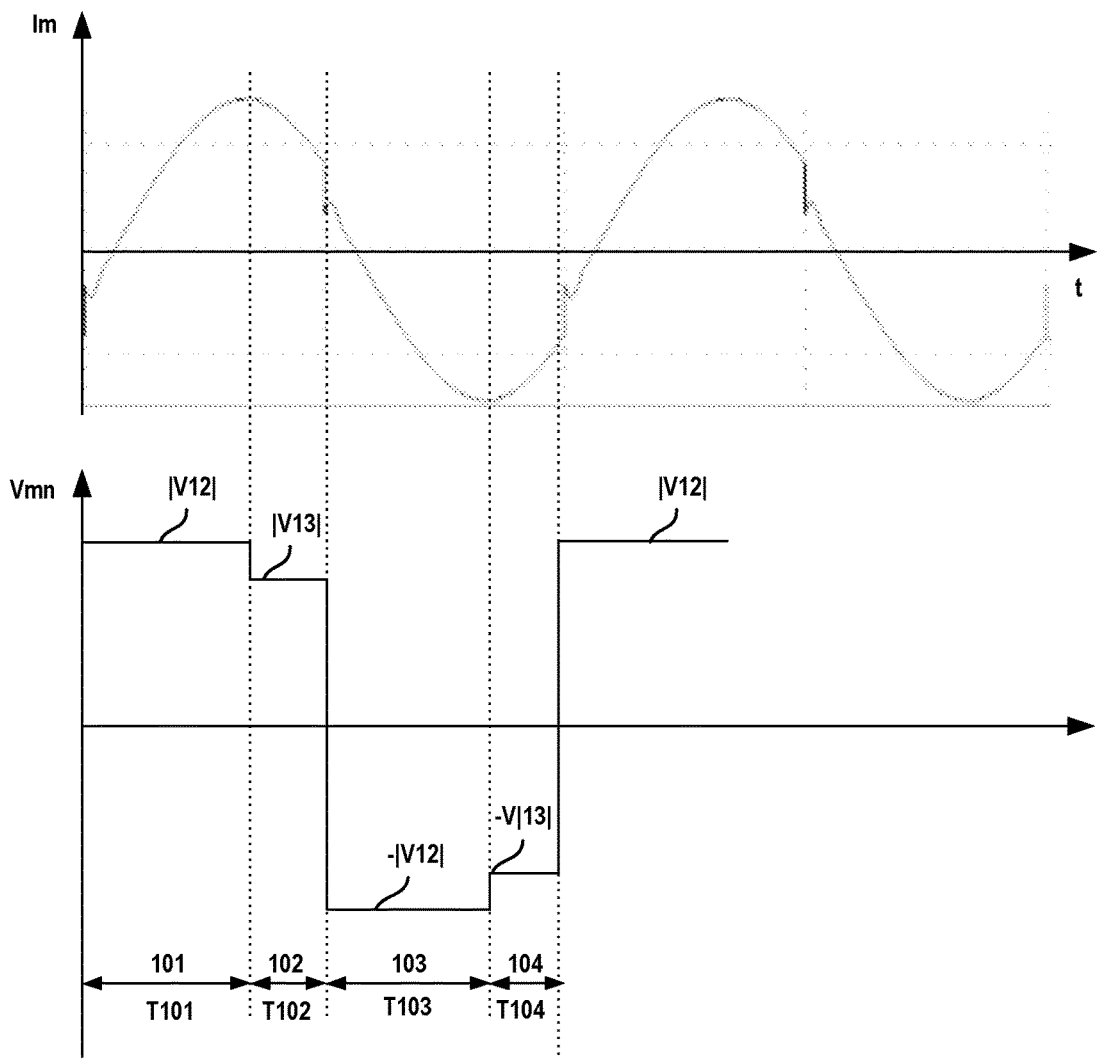
FIG. 15 shows signal waveforms that illustrate one example of an input current received by the transmitter circuit and the corresponding alternating intermediate voltage.

FIG. 15 illustrates one example of the current Im through the transmitter circuit during one period of the alternating intermediate voltage Vmn. Just for the purpose of illustration, the current waveform illustrated in FIG. 15 is the current waveform occurring in a transmitter circuit 4 that includes a resonant circuit 43 of the type illustrated in FIG. 12.

Referring to FIG. 15, the current Im is an alternating current with a positive half-period and the negative half-period, wherein there is (slight) phase shift between the positive half-period of the alternating intermediate voltage Vmn and the positive half-period of the current Im and between the negative half-period of the alternating intermediate voltage Vmn and the negative half-period of the current Im. This phase shift is due to the fact that it takes some time for the current Im to change the current direction after the alternating intermediate voltage Vmn has changed its polarity.

Figure 16:
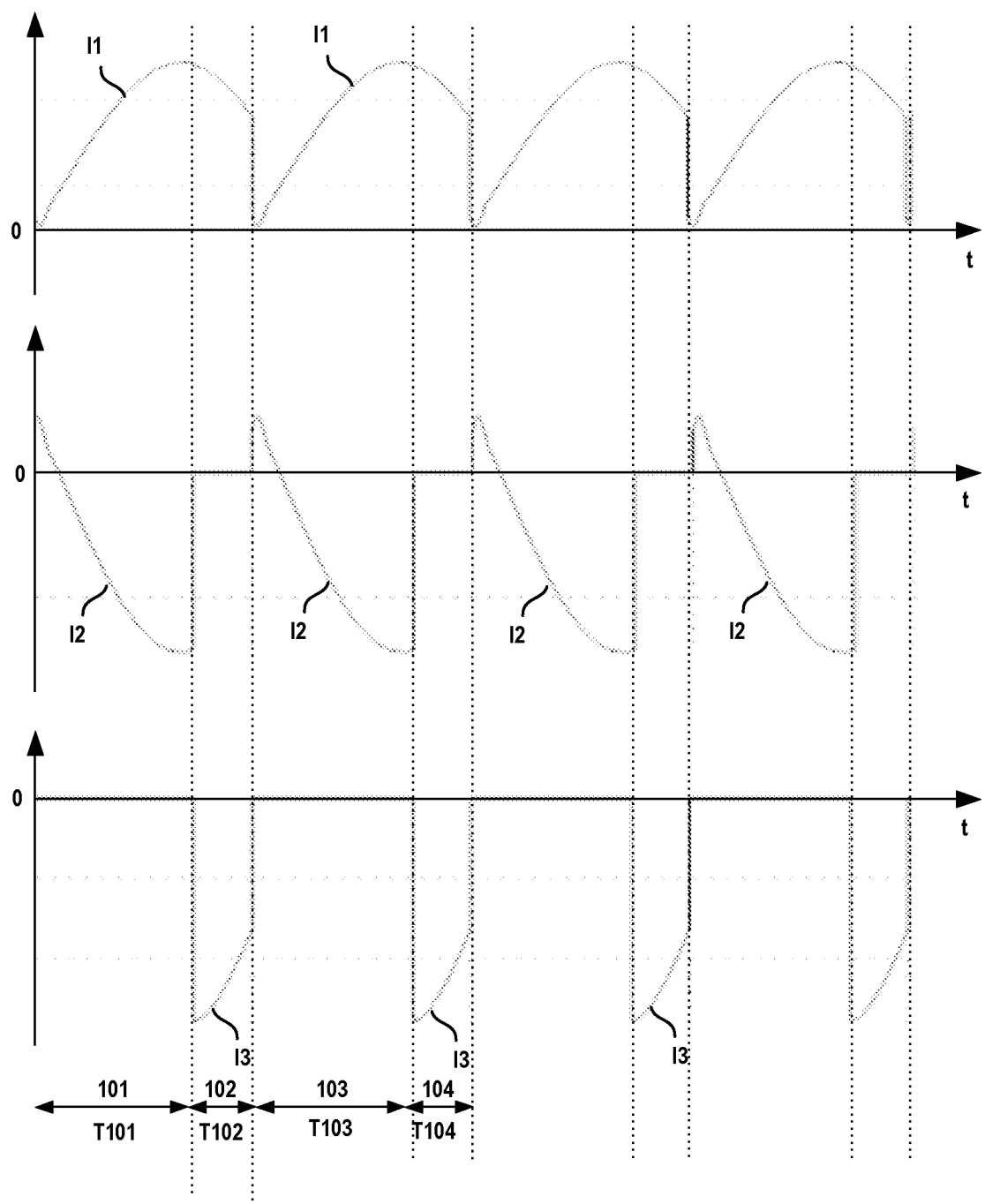
FIG. 16 shows signal waveforms that illustrate input currents at input nodes of the power converter.

FIG. 16 illustrates the input current at the three input nodes a, b, c over several periods of the alternating intermediate voltage Vmn. In FIG. 16, I1 denotes the input current at that input node that receives the highest input voltage V1, I2 denotes the input current at the input node that receives the second highest input voltage V2, and I3 denotes the input current at the input node that receives the lowest input voltage V3. FIG. 16 illustrates an operating scenario in which the highest input voltage V1 is positive and the second highest and the lowest input voltage V2, V3 are negative. FIG. 16, for example, illustrates operation of the power converter in the first state ST1 in which the first input voltage Va is the highest input voltage V1, the second input voltage Vb is the second highest input voltage V2, and the third input voltage Vc is the lowest input voltage V3. In this example, input current I1 illustrated in FIG. 16 equals the first input current Ia, input current I2 equals the second input current Ib, and input current I3 equals the third input current Ic.

As can be seen from FIG. 16, at the input node that receives the highest input voltage V1, such as the first input node a in the first state ST1, the input current flows throughout the respective operating state. The polarity of the currents at the two other input nodes, such as the second and third input nodes b, c in the first state ST1, is opposite the polarity of the current at the input node that receives the highest input voltage. In the method explained herein before, the current received at the input node with the highest input voltage only flows to one of the two other input nodes at the same time and has the same magnitude as the current received at the input node with the highest input voltage. In each period of the alternating intermediate voltage Vmn the current received at the input node with the highest input voltage flows to the input node receiving the second highest input voltage for the first time duration T1 and to the input node with the lowest input voltage for the second time duration T2. Thus, by suitably adjusting the first and second time durations T1, T2 the current received at the input node with the highest input voltage can be distributed to the input nodes receiving the second highest and the lowest input voltage in order to control the current waveforms of the (average) input currents and achieve power factor correction (PFC).

It should be noted that FIG. 16 illustrates the waveforms of the input currents I1, I2, I3 over a time duration that is so short as compared to the duration of one period of the input voltages Va, Vb, Vc that the input voltages Va, Vb, Vc can be considered to be essentially constant over this time duration. Furthermore, as can be seen from FIG. 16, the input currents I1, I2, I3 (wherein each of these input currents I1, I2, I3 corresponds to a respective one of the input currents Ia, Ib, Ic) vary due to the switched mode operation of the switching circuit 1 within the time duration illustrated in FIG. 16. Average input currents, which are input currents obtained by averaging the input currents I1, I2, I3 over the time duration of one or more drive cycles (switching cycles) of the switching circuit 1, however, are essentially constant over the time duration illustrated in FIG. 16. Such averaging of the input currents I1, I2, I3 is achieved by the filter 7, for example.

By generating the input currents Ia, Ib, Ic in the way explained hereinabove, current waveforms of the input currents Ia, Ib, Ic are controlled to be dependent on voltage waveforms of the input voltages Va, Vb, Vc. More specifically, current waveforms of the average input currents Ia, Ib, Ic correspond to the voltage waveforms of the input voltage is Va, Vb, Vc. "To correspond" in this context includes that the current waveforms have the same frequency and type of waveform as the voltage waveforms. At the same time, the alternating intermediate voltage Vmn is generated based on the input voltages Va, Vb, Vc.

Amplitudes of the average input currents Ia, Ib, Ic may vary dependent on the power consumption of a load connected to the output q, r, so that a proportionality factor between the input voltages Va, Vb, Vc and the average input currents Ia, Ib, Ic may vary dependent on the power consumption of the load.

FIGS. 17A-17D illustrate examples for operating the switching circuit 1 in order to generate the alternating intermediate voltage Vmn based on the line-to-line voltages Vab, Vbc, Vca. Each of FIGS. 17A-17D illustrates the switching circuit 1 in a respective operating state. To ease understanding, the switches of the switching circuit 1 are not illustrated in FIGS. 17A-17D. Furthermore, legs of the half-bridges 1a, 1b, 1c that include a switch that is the on-state are drawn in solid lines and the reference sign of the respective switch is indicated next to the respective legs. Legs that include a switch that is in the off-state are omitted. Just for the purpose of illustration, FIGS. 17A-17D illustrate different operating states of the switching circuit 1 when the input voltage system is in the first state ST1.

As explained before and as illustrated in FIG. 8, in the first state ST1, the first line-to-line voltage Vab, which is the voltage between the first and second input nodes a, b, is the highest line-to-line voltage V12 and is positive, and the third line-to-line voltage Vca, which is the voltage between the third and first input nodes c, a is the second highest line-to-line voltage V12 and is negative.

Figure 17A:
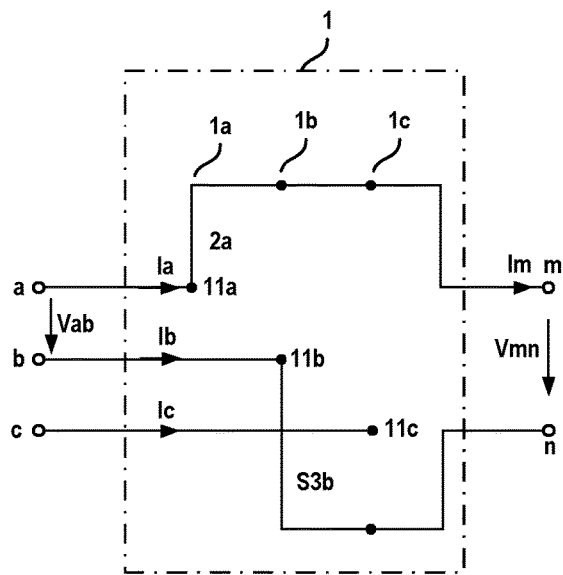
FIGS. 17A-17D show different operating state of the switching circuit in order to illustrate one example for operating the alternating intermediate voltage using the switching circuit.

FIG. 17A illustrates the operating state of the switching circuit 1 during the first time period 201 illustrated in FIG. 6. During this time period, the magnitude of the alternating intermediate voltage Vmn equals the magnitude of the highest line-to-line voltage V12 and the alternating intermediate voltage Vmn is positive. In the first state ST1, this can be achieved by generating the alternating intermediate voltage Vmn such that it equals the first line-to-line voltage Vab. For this, the first input node a is connected to the first input node m of the transmitter circuit 4 by switching on the first switch 2a of the first half-bridge 1a, and the second input node b is connected to the second input node n of the transmitter circuit 4 by switching on the second switch 3b of the second half-bridge 1b.

Figure 17B:
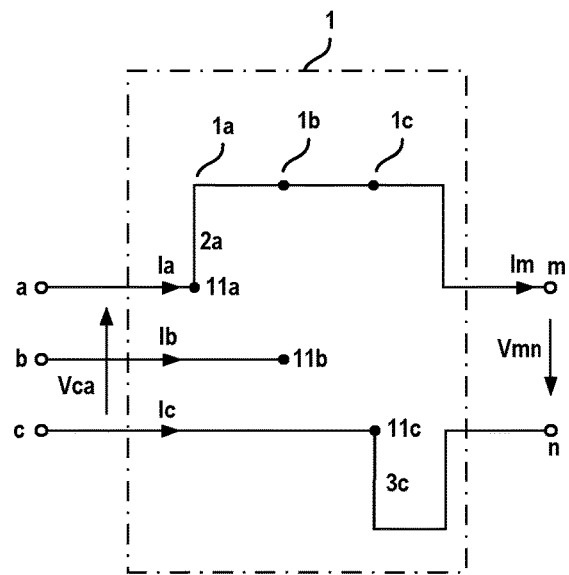

FIG. 17B illustrates the operating state of the switching circuit 1 during the second time period 202 illustrated in FIG. 6. During this time period, the magnitude of the alternating intermediate voltage Vmn equals the magnitude of the second highest line-to-line voltage V13 and the alternating intermediate voltage Vmn is positive. In the first state ST1, this can be achieved by generating the alternating intermediate voltage Vmn such that it equals the inverted third line-to-line voltage Vca. For this, the third input node c is connected to the second input node n of the transmitter circuit 4 by switching on the second switch 3c of the third half-bridge 1c, and the first input node a remains connected to the first input node m of the transmitter circuit 4 by switching on the first switch 2a of the first half-bridge 1a.

Figure 17C:
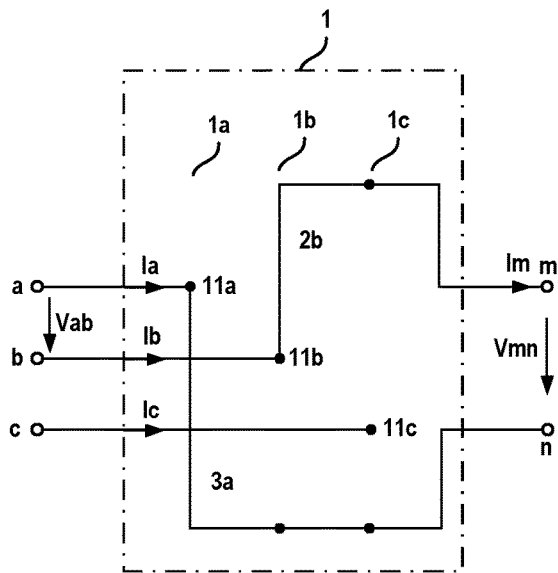

FIG. 17C illustrates the operating state of the switching circuit 1 during the third time period 203 illustrated in FIG. 6. During this time period, the magnitude of the alternating intermediate voltage Vmn equals the magnitude of the highest line-to-line voltage V12 and the alternating intermediate voltage Vmn is negative. In the first state ST1, this can be achieved by generating the alternating intermediate voltage Vmn such that it equals the inverted first line-to-line voltage Vab. For this, the first input node a is connected to the second input node n of the transmitter circuit 4 by switching on the second switch 3a of the first half-bridge 1a, and the second input node b is connected to the first input node m of the transmitter circuit 4 by switching on the first switch 2b of the second half-bridge 1b.

Figure 17D:
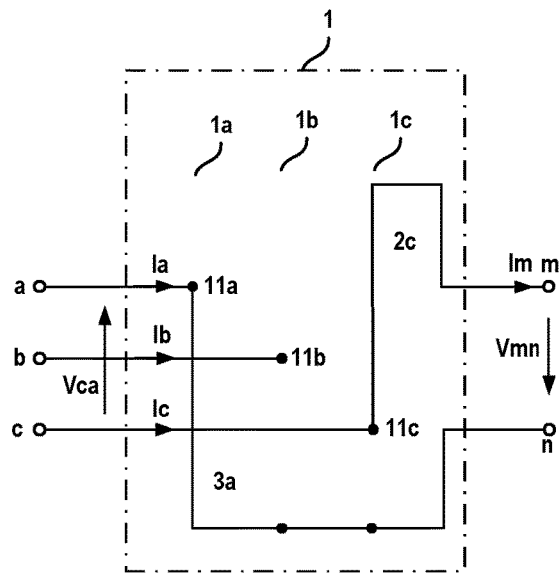

FIG. 17D illustrates the operating state of the switching circuit 1 during the fourth time period 104 illustrated in FIG. 6 During this time period, the magnitude of the alternating intermediate voltage Vmn equals the magnitude of the second highest line-to-line voltage V13 and the alternating intermediate voltage Vmn is negative. In the first state ST1, this can be achieved by generating the alternating intermediate voltage such that it equals the (negative) third line-to-line voltage Vca. For this, the third input node c is connected to the first input node m of the transmitter circuit 4 by switching on the first switch 2c of the third half-bridge 1c, and the first input node a remains connected to the second input node n of the transmitter circuit 4 by switching on the second switch 3a of the first half-bridge 1a.

As can be seen from FIGS. 17A-17D, in each of the different state of the input voltage system the controller 6 can operate the switches of the switching circuit 1 in accordance with a predefined switching pattern, wherein the timing is defined by the first and second time duration references T1*, T2* explained herein before.

Referring to FIG. 7, the alternating intermediate voltage Vmn may include a dead time T205 in which the alternating intermediate voltage Vmn is zero. In the first state ST1, this can be achieved by switching on both switches 2a, 3a of the first half-bridge 1a during the data time and switching of the switches of each of the other half-bridges 1b, 1c.

According to one example, the switches 2a-2c, 3a-3c of the switching circuit 1 are bidirectionally blocking electronic switches. A "bidirectionally blocking electronic switch" is an electronic switch that, in the off-state, is configured to block independent of a polarity of a voltage of applied across the electronic switch.

According to one example, each of the bidirectionally blocking electronic switches 2a-2c, 3a-3c of the switching circuit 1 includes two unidirectionally blocking electronic switches connected in series. A "unidirectionally blocking electronic switch" is an electronic switch that, in the off-state, is configured to block when a voltage applied across the switch has a first polarity and is configured to conduct when the voltage has a second polarity opposite the first polarity. A unidirectionally blocking electronic switch can be considered to include a switching element and a freewheeling element, such as a diode, connected in parallel with the switching element. In the off-state, the switching element blocks independent of the polarity of the voltage across the electronic switch, while the freewheeling element blocks when the voltage has the first polarity and conducts when the voltage has the second polarity.

The two unidirectionally blocking electronic switches that form a bidirectionally blocking electronic switch are referred to as partial switches in the following. A bidirectionally blocking electronic switch can be implemented in various ways. According to one example, the bidirectionally blocking electronic switch includes two MOSFETs (Metal Oxide Semiconductor Field-Effect Transistors) that are connected in series such that internal body diodes of the MOSFETs are connected in anti-series. The body diode of a MOSFET acts as a freewheeling element and makes the MOSFET a unidirectionally blocking electronic switch.

According to another example, the bidirectionally blocking electronic switch is a bidirectionally blocking gallium nitride (GaN) switch. Such bidirectionally blocking GaN switch includes two GaN HEMTs (High Electron-Mobility Transistors) that are connected in series such that internal freewheeling elements are connected in anti-series.

In each case, the bidirectionally blocking electronic switch is configured to receive two drive signals. That is, the bidirectionally blocking electronic switch is configured to receive a respective drive signal for each of the two partial switches. The bidirectionally blocking switch is in the off-state when each of the partial switches is in the off-state and is in the on-state when each of the partial switches is in the on-state. In the off-state, the bidirectionally blocking switch blocks independent of the polarity of the voltage applied across the switch. In the on-state, the bidirectionally blocking switch conducts independent of the polarity of the voltage applied across the switch.

The bidirectionally blocking switch is in a transition state when one of the two partial switches is in the on-state and the other one of the two partial switches is in the off-state. In this operating mode, the bidirectionally blocking switch conducts or blocks dependent on the polarity of the voltage applied across the bidirectionally blocking electronic switch and, therefore, acts as a unidirectionally blocking electronic switch.

Figure 18:
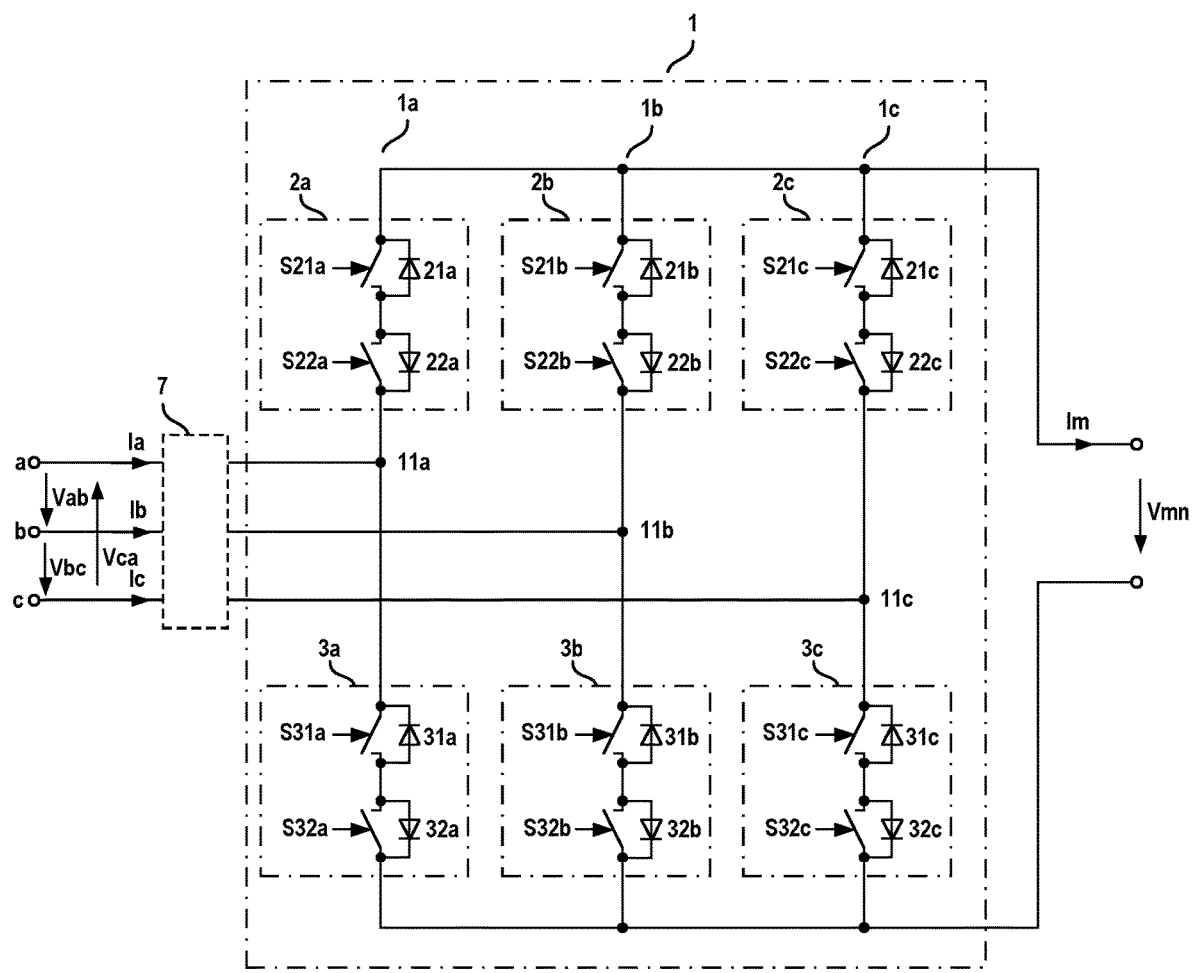
FIG. 18 shows a switching circuit according to another example.

FIG. 18 illustrates one example of the switching circuit 1 in which each of the switches 2a-2c, 3a-3c is a bidirectionally blocking electronic switch and includes two partial switches, a first partial switch 21a-21c, 31a-31c and a second partial switch 22a-22c, 32a-32c, wherein the two partial switches are connected in series such that freewheeling elements included in each of the two partial switches are connected in anti-series. Each of the first and second partial switches 21a-21c, 31a-31c, 22a-22c, 32a-32c forms a unidirectionally blocking switch. Just for the purpose of illustration, these unidirectionally blocking switching elements are drawn to include a switching element and a freewheeling element connected in parallel with the switching element. Just for the purpose of illustration, the freewheeling element is drawn as a diode in the example illustrated in FIG. 18. Each of the partial switches 21a-21c, 31a-31c, 22a-22c, 32a-32c receives a respective drive signal S21a-S21c, S31a-S31c, S22a-S22c, S32a-S32c that is generated by the controller (not illustrated in FIG. 18) and that is configured to switch on or off the respective partial switch 21a-21c, 31a-31c, 22a-22c, 32a-32c.

Referring to the above, the current received at the input node with the highest input voltage, such as the current Ia received at the first input node a in the first state ST1, is switched between the input nodes with the second highest and the lowest input voltages, such as the second and third input nodes b, c in the first state ST1. Referring to the above, a bidirectionally blocking switch may be operated in a transition state in which the bidirectionally blocking switch operates as a unidirectionally blocking electronic switch. In the switching circuit 1 according to FIG. 18, this functionality of the bidirectionally blocking electronic switches can be used to switch the current from one input node to another one of the input nodes, such as from the second node b to the third node c in the first state ST1, without interrupting the current and without short-circuiting the two input nodes. Both interrupting the current and short-circuiting the input nodes is highly undesirable. In the first case, high voltages across the switches may occur due to energy inductively stored in the primary winding 41 and/or the inductor 432 of the transmitter circuit. In the second case, high current losses may occur.

Operating the switching circuit 1 such that the current Im through the transmitter circuit 4 is not interrupted and such that short-circuits between the input nodes a, b, c are prevented is explained with reference to FIGS. 19A-19M in the following. Each of these FIGS. illustrates the switching circuit 1 in a respective operating state. The switching elements of the bidirectionally blocking switches are not illustrated in these drawings.

Each of these bidirectionally blocking switches can have four operating states which are represented as follows.
- (a) In a first state, both partial switches are in the on-state. In this case, the unidirectionally blocking electronic switch is represented by a solid line and the reference sign of the respective bidirectionally blocking electronic switch is indicated next to the solid line.
- (b) In a second state, both partial switches are in the off-state. In this case, the connection that includes the respective bidirectionally blocking electronic switch is omitted (the connection is open) and the reference sign of the respective bidirectionally blocking electronic switch is omitted.
- (c) In a third state, the switching element of the first partial switch is in the on-state, and the switching element of the second partial switch is in the off-state. In this case, the partial switch that is in the on-state is represented by a solid line and the reference sign of the respective partial switches indicated next to the solid line. Furthermore, the partial switch that is in the off-state is represented by its freewheeling element.
- (d) In a fourth state, the switching element of the first partial switch is in the off-state, and the switching element of the second partial switch is in the on-state. In this case, the partial switch that is in the on-state is represented by a solid line and the reference sign of the respective partial switches indicated next to the solid line. Furthermore, the partial switch that is in the off-state is represented by its freewheeling element.

For the purpose of illustration, FIGS. 19A-19M illustrate the operating state of the switching circuit 1 at the beginning, during, and the end of the first and second time segments 201, 202 and the dead time 205 illustrated in FIG. 7. Furthermore, FIGS. 19A-19M illustrate the operating states during the first state ST1 of the input voltage system in which the first line-to-line voltage Vab is the highest line-to-line voltage V12 and is positive and the third line-to-line voltage Vca is the second highest line-to-line voltage V13 and is negative.

The symbol in the upper right corner of each of FIGS. 19A-19M schematically illustrates the alternating intermediate voltage Vmn during the positive half-period (during time segments 101, 102), wherein the black dot illustrates at which time of the positive half-period the operating state illustrated in the respective drawing occurs. The curved arrows illustrate the current direction of the current through the transmitter circuit 4, wherein only the primary winding 41 is illustrated in FIGS. 19A-19M. The transmitter circuit 4 may include a resonant circuit (not illustrated) on the primary side.

FIG. 19A shows the switching state of the switching circuit 1 at the end of the dead time 205. Referring to the above, during the dead time 205 both switches 2a, 3a of the first half-bridge 1a may be switched on. During the negative half-period preceding the dead time 205 illustrated in FIG. 19A, the current Im flows in the direction as illustrated by the curved arrows and opposite the direction indicated by the arrow next to reference sign Im. The first switch 2a, which remains in the on-state throughout the positive half-period of the alternating intermediate voltage Vmn is already in the on-state during the dead time 205. During the dead time 205 the input current Ia, Ib, Ic are zero.

Between the dead time 205 and the first time segment 201 the current flowing in the current loop formed by the primary side of the transmitter circuit 4 and the half-bridge 1a is to be commuted from the bridge leg including the second switch 3a of the first half-bridge 1a to the bridge leg including the second switch 3b of the second half-bridge 1b. For this, at the end of the dead time 205, the second partial switch 32a of the second switch 3a of the first half-bridge 1a is switched off, as illustrated in FIG. 19A. In this operating state, the current continues to flow in the current loop provided by the primary side of the transmitter circuit 4 and the half-bridge 1a, wherein the first partial switch 31a and the freewheeling element of the second partial switch 32a of the second switch 3a of the first half-bridge 1a conduct the current.

In a next step illustrated in FIG. 19B, still at the end of the dead time 205, the first partial switch 31b of the second switch 3b of the second half-bridge 1b switches on. At this time, the current still flows through the second switch 3a of the first half-bridge 1a.

The second switch 3b of the second half-bridge 1b takes over the current in a next step illustrated in FIG. 19C in which the first partial switch 31a of the second switch 3a of the first half-bridge 1a switches of, so that this second switch 3a is in the off-state. In this switching state, the alternating intermediate voltage is in the transition between the dead time 205 and the first time segments 201. Furthermore, in this operating state input currents different from zero flow at the first and second input nodes a, b.

In a next step illustrated in FIG. 19D, the second partial switch 32b of the second switch 3b of the second half-bridge 1b switches on, so that this second switch 3b is in the on-state. Referring to FIGS. 19A-19D the switching state of the switching circuit 1 changes four times between the switching state in the dead time 205 in which the second switch 3a of the first half-bridge 1a is in the on-state and the switching state in the first time segment 201 in which the second switch 3b of the second half-bridge is in the on-state. Thus, this type of changing the switching state of the switching circuit 1 may also be referred to as 4-step commutation.

At the beginning of the first time segments 201, the current direction is still the same current direction as at the end of the negative half-period. However, as illustrated in FIG. 19E, the current changes its direction during the first time segment 201.

Referring to FIGS. 19F-19G there is another 4-step communication between the switching state in the first time segment 201 in which the second switch 3b of the second half-bridge 1b is in the on-state and the switching state illustrated in FIG. 19G in the second time segment 202 in which the second switch 3c of the third half-bridge 1c is in the on-state. This 4-step commutation includes: (1) Switching off the first partial switch 31b of the second switch 3b of the second half-bridge 1b, as illustrated in FIG. 19F, so that the freewheeling element of the first partial switch 31b takes over the current. (2) Switching on the second partial switch 32c of the second switch 3c of the third half-bridge 1c, as illustrated in FIG. 19G. In the switching state, the current still flows through the second switch 3b of the second half-bridge 1b. (3) Switching off the first partial switch 31b of the second switch 3b of the second half-bridge 1b, as illustrated in FIG. 19H, so that the freewheeling element of the first partial switch 31c of the second switch 3c of the third half-bridge 1c takes over the current. (4) Finally, switching on the first partial switch 31c of the second switch 3c of the third half-bridge 1c, as illustrated in FIG. 19I, so that this second switch 3c is in the on-state.

Figure 19M:
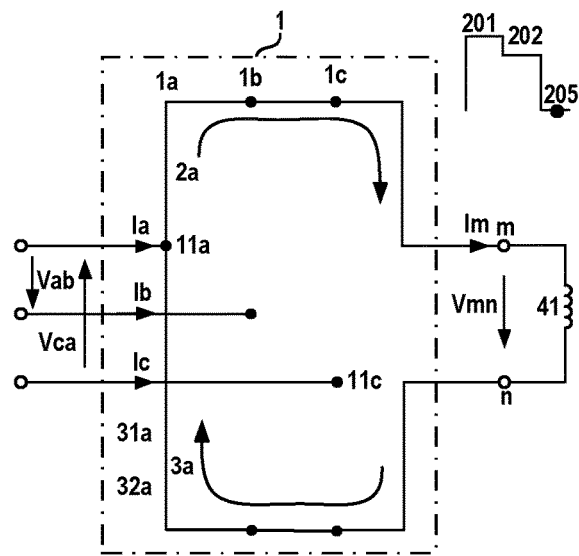

Referring to FIGS. 19J-19M there is another 4-step commutation between the switching state in the second time segment 202 illustrated in FIG. 19I and the switching state in the dead time 205. This 4-step commutation includes: (1) Switching off the first partial switch 31c of the second switch 3c of the third half-bridge 1c, as illustrated in FIG. 19J, so that the freewheeling element of the first partial switch 31c takes over the current. (2) Switching on the second partial switch 32a of the second switch 3a of the first half-bridge 1a, as illustrated in FIG. 19K. In this switching state, the current continues to flow through the second switch 3c of the second half-bridge 1c. (3) Switching off the second partial switch 32c of the second switch 3c of the third half-bridge 1c, as illustrated in FIG. 19L, so that the freewheeling element of the first partial switch 31a of the second switch 3a of the first half-bridge 1a takes over the current. (4) switching on the first partial switch 31a of the second switch 3a of the first half-bridge 1a, as illustrated in FIG. 19M, so that the second switch 3a of the first half-bridge 1a is in the on-state.

Each of the 4-step commutations explained herein before has the effect that the current is commentating from one leg of one half-bridge to a leg of another half-bridge without interrupting the current and without short-circuiting two input nodes. Equivalently, 4-step commutations may take place between the dead time 205 and the third and fourth time segments during the negative half-period of the alternating intermediate voltage Vmn.

In the example illustrated in FIG. 6, each of the positive half-period and the negative half-period of one period of the alternating intermediate voltage Vmn includes exactly one time segment in which the magnitude equals the highest line-to-line voltage V12 and exactly one time segment in which the magnitude equals the second highest line-to-line voltage V13. This, however, is only an example. It is also possible to generate the alternating intermediate voltage Vmn such that the positive half-period includes two or more time segments in which the magnitude equals the highest line-to-line voltage V12 and two or more time segments in which the magnitude equals the second highest line-to-line voltage V13. This is illustrated in FIG. 20.

T211+T213+T215+T217=T1T212+T214+T216+T218=T2T211+T213=T215+T217T212+T214=T216+T218

Figure 20:
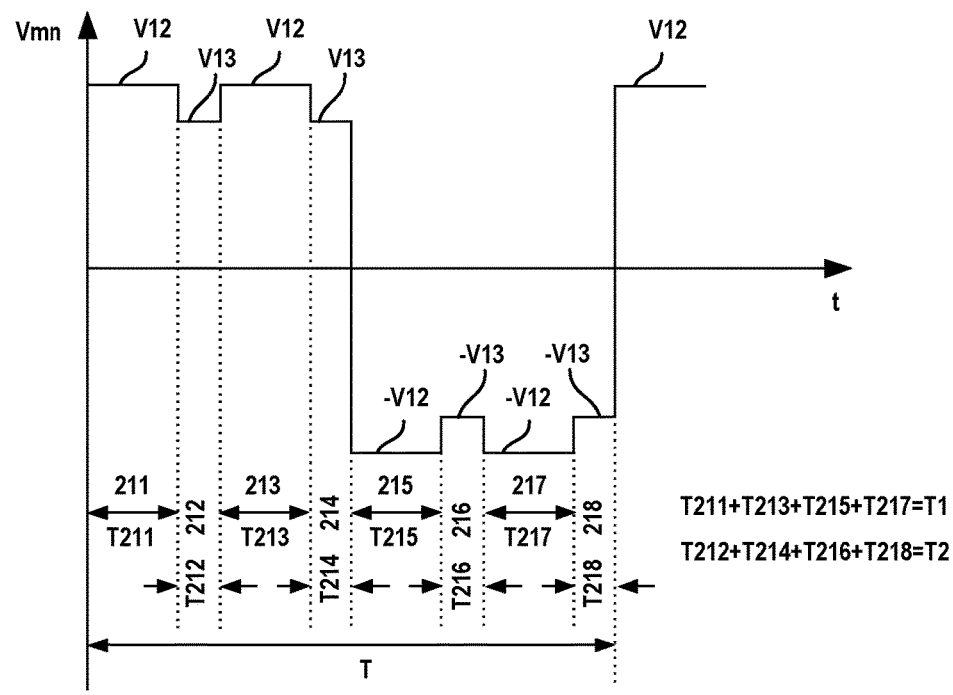
FIG. 20 shows a signal waveform that illustrates an alternating intermediate voltage according to another example.

FIG. 20 illustrates one example of the alternating intermediate a voltage Vmn in which the positive half-period includes two times segments 211, 213 in which the magnitude equals the highest line-to-line voltage V12 and two times segments 212, 214 in which the magnitude equals the second highest line-to-line voltage V13. Equivalently, the negative half-period includes 2 times segments 215, 270 in which the magnitude equals the highest line-to-line voltage V12 and two times segments 216, 218 in which the magnitude equals the second highest line-to-line voltage V13 period. Each of these time segments has a respective duration T211, T212, T213, T214, T215, T216, T217. An overall duration in which the magnitude equals the highest line-to-line voltage V12 equals the first time duration T1, and an overall duration in which the magnitude equals the second highest line-to-line voltage V13 equals the second time duration T2, that is, $$T211 + T213 + T215 + T217 = T1T212 + T214 + T216 + T218 = \quad (7a)$$

$$T2T211 + T213 = T215 + T217T212 + T214 = T216 + T218$$

$$T211 + T213 + T215 + T217 = T1T212 + T214 + T216 + T218 =$$

$$T2T211 + T213 = T215 + T217T212 + T214 = T216 + T218$$

$$T211 + T213 = \quad (7b)$$

$$T215 + T217 = T1T212 + T214 = T216 + T218 = T2T211 +$$

$$T213 = T215 + T217T212 + T214 = T26 + T218.$$

Moreover, in order to achieve zero DC offset of the alternating intermediate a voltage Vmn the overall time duration, in the positive half-period, in which the magnitude equals the highest line-to-line voltage V12 equals the overall time duration, in the negative half-period, in which the magnitude equals the highest line-to-line voltage V12, and the overall time duration, in the positive half-period, in which the magnitude equals the second highest line-to-line voltage V13 equals the overall time duration, in the negative half-period, in which the magnitude equals the second highest line-to-line voltage V13, that is, $$T211 + T213 + T215 + T217 = T1T212 + T214 + T216 + T218 = \quad (8a)$$

$$T2T211 + T213 = T215 + T217T212 + T214 = T216 + T218$$

$$T211 + T213 + T215 + T217 =$$

$$T1T212 + T214 + T216 + T218 = T2T211 +$$

$$T213 = T215 + T217T212 + T214 = T216 + T218$$

$$T211 + T213 + T215 + T217 = \quad (8b)$$

$$T1T212 + T214 + T216 + T218 = T2T211 + T213 =$$

$$T215 + T217T212 + T214 = T216 + T218.$$

The description provided hereinbefore illustrates operation of the power converter in a normal (steady) operation mode. During startup, which is a time period after the power converter has been connected to the input nodes a, b, c and during which the output voltage Vqr increases, the power converter may be operated in a startup mode. Operating the power converter in the startup mode can be similar to operating the power converter in the normal mode, wherein the dead time T205=T3 may be higher in the startup mode than in a normal mode. According to one example the dead time is set to a start value, at the beginning of the startup mode, and decrease over the startup period to a final value that is used in the normal operation mode.

Some of the aspects explained above are summarized in the following by way of numbered examples.

Example 1: A power converter, comprising: switching circuit configured to receive several input voltages (and configured to generate an alternating intermediate voltage; and a control circuit according to any one of s 9 to 13 configured to control operation of the switching circuit.

Example 2: The power converter according to example 1, further comprising: a transmitter circuit configured to receive the alternating intermediate voltage, comprising a galvanic isolation barrier, and configured to generate a further alternating voltage; and a rectifier circuit configured to receive the further alternating voltage and to provide a rectified output voltage based on the further alternating voltage.

Example 3: The power converter according to example 2, wherein the transmitter circuit comprises a transformer as the galvanic isolation barrier.

Example 4: The power converter according to any one of the previous examples, wherein the switching circuit includes a plurality of bidirectionally blocking switches.

Example 5: The power converter according to example 4, wherein the bidirectionally blocking switches are bidirectionally blocking GaN switches.

The invention claimed is:

1. A method, comprising:
generating an alternating intermediate voltage based on three alternating input voltages received at an input of a power converter;
   wherein generating the alternating intermediate voltage comprises controlling waveforms of three input currents received at the input dependent on waveforms of the three alternating input voltages;
   wherein generating the alternating intermediate voltage and controlling the waveforms of the three input currents comprises:
   detecting a highest line-to-line voltage, a second highest line-to-line voltage based on the three alternating input voltages;
   generating the alternating intermediate voltage based on the highest line-to-line voltage and the second highest line-to-line voltage;
   wherein generating the alternating intermediate voltage comprises generating the alternating intermediate voltage such that in each period of the alternating intermediate voltage a magnitude of the alternating intermediate voltage at least approximately equals a magnitude of a highest line-to-line voltage for a first time duration and at least approximately equals a magnitude of the second highest line-to-line voltage for a second time duration;
   wherein the method further includes detecting a highest input voltage based on the three alternating input voltages and adjusting the first time duration based on the detected highest input voltage and an associated first input current.

2. The method according to claim 1, generating a rectified output voltage based on an alternating voltage at an output of the power converter that is galvanically isolated from input.

3. The method according to claim 1, wherein generating the alternating intermediate voltage further comprises generating the alternating intermediate voltage such that in each period the magnitude of the alternating voltage at least approximately equals zero for a third time duration.

4. The method according to claim 3, wherein the third time duration is less than 10% of the duration of one period of the alternating voltage.

5. The method according to claim 1, wherein adjusting the first time duration further comprises:
   adjusting the first time duration based on a second input current received at an input that receives the second highest input voltage.

6. The method according to claim 5, wherein adjusting the first time duration based on the detected highest input voltage, the first input current, and the second input current comprises:
   calculating a conductance based on detected highest input voltage and the associated input current;
   calculating an input current reference for the second input current based on the conductance and the second highest input voltage;
   calculating an error current based on the input current reference and the second input current; and
   adjusting the first time duration based on the error current.

7. The method according to claim 1, wherein adjusting the second time duration comprises:
   adjusting the second time duration based on the first time duration and a desired duration of one period of the alternating intermediate voltage.

8. The method according to claim 1,
   wherein generating the alternating voltage comprises generating the alternating voltage by a switching circuit that includes a plurality of switches and receives the alternating input voltages,
   wherein the alternating input voltages, in each period of the alternating input voltages, include a plurality of unique states, and
   wherein, in each of the unique states, the switches of the switching circuit are operated in accordance with a predefined switching pattern.

9. A computer program comprising computer program code configured to cause a programmable controller to execute the method of claim 1 when said computer program code is executed on the programmable controller.

10. A control circuit configured to control operation of a switching circuit power converter to generate, an alternating voltage based on three alternating input voltages received at an input of the switching circuit power converter and to control waveforms of three input currents received at the input dependent on waveforms of the three alternating input voltages;
   wherein, to control operation of the switching circuit power converter to generate the alternating voltage and control the waveforms of the input currents, the control circuit is configured to:
   detect a highest line-to-line voltage, a second highest line-to-line voltage, and a highest input voltage based on several input voltages received at an input of the switching circuit power converter;
   control the switching circuit power converter to generate the alternating voltage based on the highest line-to-line voltage and the second highest line-to-line voltage such that in each period of the alternating intermediate voltage a magnitude of the alternating voltage at least approximately equals the magnitude of highest line-to-line voltage for a first time duration and at least approximately equals the magnitude of the second highest line-to-line voltage for a second time duration, and
   wherein the control circuit is further configured to adjust the first time duration based on the detected highest input voltage and an associated first input current.

11. The control circuit according to claim 10, wherein the control circuit is configured to adjust the first time duration based on a second input current received at an input that receives the second highest input voltage.

12. The control circuit according to claim 11, wherein the control circuit, to adjust the first time duration, is configured to calculate a conductance based on detected highest input voltage and the associated input current;
   calculate an input current reference for the second input current based on the conductance and the second highest input voltage;
   calculate an error current based on the input current reference and the second input current; and
   adjust the first time duration based on the error current.

13. The control circuit according to claim 12,
wherein the control circuit is further configured to adjust the second time duration based on the first time duration and a desired duration of one period of the alternating intermediate voltage.

14. A method, comprising:
generating an alternating intermediate voltage based on three alternating input voltages received at an input of a power converter;
- wherein generating the alternating intermediate voltage comprises controlling waveforms of three input currents received at the input dependent on waveforms of the three alternating input voltages;
- wherein generating the alternating intermediate voltage and controlling the waveforms of the three input currents comprises:
- detecting a highest line-to-line voltage, a second highest line-to-line voltage based on the three alternating input voltages; and
- generating the alternating intermediate voltage based on the highest line-to-line voltage and the second highest line-to-line voltage.

\* \* \* \* \*